(12) United States Patent
Gallop

(10) Patent No.: US 12,364,275 B2
(45) Date of Patent: *Jul. 22, 2025

(54) METHODS TO PRODUCE HIGH PROTEIN ANIMAL FEED FROM A GRAIN PROCESSING PLANT THAT PRODUCES ALCOHOL

(71) Applicant: ICM, Inc., Colwich, KS (US)

(72) Inventor: Charles C. Gallop, Gower, MO (US)

(73) Assignee: ICM, Inc.

(*) Notice: Subject to any disclaimer, the term of this patent is extended or adjusted under 35 U.S.C. 154(b) by 0 days.

This patent is subject to a terminal disclaimer.

(21) Appl. No.: 18/417,574

(22) Filed: Jan. 19, 2024

(65) Prior Publication Data
US 2024/0206499 A1    Jun. 27, 2024

Related U.S. Application Data

(63) Continuation of application No. 18/220,597, filed on Jul. 11, 2023, now Pat. No. 11,910,811, which is a
(Continued)

(51) Int. Cl.
| | |
|---|---|
| A23K 10/38 | (2016.01) |
| A23K 20/10 | (2016.01) |
| A23K 20/142 | (2016.01) |
| A23K 40/00 | (2016.01) |
| B01D 3/00 | (2006.01) |
| B01D 37/00 | (2006.01) |
| D21C 9/02 | (2006.01) |

(52) U.S. Cl.
CPC ............. *A23K 40/00* (2016.05); *A23K 10/38* (2016.05); *A23K 20/142* (2016.05); *B01D 3/001* (2013.01);
(Continued)

(58) Field of Classification Search
CPC ...... A23K 40/00; A23K 20/142; A23K 10/30; A23K 10/32; A23K 10/37; A23K 10/38;
(Continued)

(56) References Cited

U.S. PATENT DOCUMENTS

| | | | | |
|---|---|---|---|---|
| 4,171,383 A | * | 10/1979 | Chwalek | ............... C08B 30/046 |
| | | | | 426/630 |
| 11,553,726 B2 | | 1/2023 | Gallop et al. | |

(Continued)

FOREIGN PATENT DOCUMENTS

WO     2005021742 A2    3/2005

OTHER PUBLICATIONS

United States Patent and Trademark Office, Restriction Requirement Received in U.S. Appl. No. 16/875,894, mailed Apr. 7, 2023.
(Continued)

*Primary Examiner* — Joseph W Drodge
(74) *Attorney, Agent, or Firm* — SNELL & WILMER L.L.P.

(57) ABSTRACT

This disclosure describes methods to separate solids from liquids in a production facility. A process separates components in a defiber process stream by using two or more mechanical devices to separate the solids from the liquids based on density differences. The process produces animal feed products having a protein content ranging from approximately 45% to approximately 64%.

19 Claims, 13 Drawing Sheets

Related U.S. Application Data continuation of application No. 16/875,894, filed on May 15, 2020, now Pat. No. 11,910,810.

(60) Provisional application No. 62/849,554, filed on May 17, 2019.

(52) U.S. Cl.
CPC .............. B01D 37/00 (2013.01); D21C 9/02 (2013.01); *B01D 2221/06* (2013.01)

(58) Field of Classification Search
CPC ...... A23K 10/14; A23K 20/147; B01D 37/00; B01D 2221/06; B01D 3/001; B01D 3/002; B01D 21/00; B01D 21/26; B01D 21/262; D21C 9/02; D21C 5/00; B03B 9/00; Y02P 60/87; C12P 7/06; C12P 7/08; C12P 7/10; C12F 3/00; C12F 3/10
See application file for complete search history.

(56) References Cited

U.S. PATENT DOCUMENTS

| | | | |
|---|---|---|---|
| 11,910,810 B2 * | 2/2024 | Gallop | ............... D21C 9/02 |
| 11,910,811 B2 * | 2/2024 | Gallop | ............ A23K 20/147 |
| 2005/0118692 A1 | 6/2005 | Kinley et al. | |
| 2006/0286654 A1 | 12/2006 | Kinley et al. | |
| 2007/0184159 A1 | 8/2007 | Paustian et al. | |
| 2008/0277264 A1 | 11/2008 | Sprague | |
| 2009/0071066 A1 | 3/2009 | Meier | |
| 2009/0119711 A1 | 5/2009 | Kitayama | |
| 2010/0159071 A1 | 6/2010 | Redford | |
| 2011/0283602 A1 | 11/2011 | Gallop et al. | |
| 2012/0064213 A1 | 3/2012 | Lee | |
| 2014/0017728 A1 | 1/2014 | Bleyer et al. | |
| 2015/0191750 A1 | 7/2015 | Bleyer et al. | |
| 2015/0211026 A1 | 7/2015 | Bazzana et al. | |
| 2017/0022529 A1 | 1/2017 | Jakel et al. | |
| 2021/0059277 A1 * | 3/2021 | Lee | ............ A23K 50/10 |

OTHER PUBLICATIONS

United States Patent and Trademark Office, Non-Final Office Action Received in U.S. Appl. No. 16/875,894, mailed Jul. 5, 2023.
United States Patent and Trademark Office, Notice of Allowance Received in U.S. Appl. No. 16/875,894, mailed Oct. 25, 2023.
United States Patent and Trademark Office, Non-Final Office Action Received in U.S. Appl. No. 18/220,597, mailed Sep. 6, 2023.
United States Patent and Trademark Office, Notice of Allowance Received in U.S. Appl. No. 18/220,597, mailed Oct. 25, 2023.

* cited by examiner

METHODS TO PRODUCE HIGH PROTEIN ANIMAL FEED FROM A GRAIN PROCESSING PLANT THAT PRODUCES ALCOHOL

CROSS-REFERENCE TO RELATED APPLICATION

This application is a continuation of, claims priority to, U.S. application Ser. No. 18/220,597, filed Jul. 11, 2023 titled "ADVANCED PROCESSING METHODS TO PRODUCE HIGH PROTEIN FEEDS FROM DRY GRIND CEREAL GRAINS" (hereinafter the '597 Application). The '597 Application is a continuation of, claims priority to, U.S. application Ser. No. 16/875,894, filed May 15, 2020 titled "FEED OPTIMIZATION TECHNOLOGY" (hereinafter the '894 Application). The '894 Application claims priority to, U.S. Provisional Application Ser. No. 62/849,554, filed May 17, 2019, titled "FEED OPTIMIZATION TECHNOLOGY," (hereinafter the '554 Application). The '597, '894 and '554 Applications are hereby incorporated by reference in their entirety for all purposes.

TECHNICAL FIELD

The subject matter of this disclosure relates to methods of separating a whole stillage process stream or a defiber process stream in a production facility for biofuels and producing valuable feed products from these methods. In particular, the subject matter is directed to using separation devices to separate components in the process stream and to recover the various components used to produce valuable feed products, such as a high protein animal product with a protein content greater than 45%. These methods help remove suspended solids, recover components, reduce the amount of energy needed for downstream processing, reduce greenhouse gas emissions and/or carbon emissions, and increase overall efficiency of processes in the production facility.

BACKGROUND

The United States relies on imported petroleum to meet the needs of transportation fuel. To reduce dependence on the imported petroleum, the Environmental Protection Agency (EPA) set standards for a Renewable Fuel Standard (RFS) program each year. The RFS is a national policy that requires a mandate to blend renewable fuels into transportation fuel, which ensures the continued growth of renewable fuels. The RFS proposes annual standards for four types of renewable fuels, such as cellulosic biofuel, biomass-based diesel, advanced biofuel, and total renewable fuel to replace or to reduce the quantity of gasoline and diesel. The new RFS2 proposal is for 36 billion gallons of renewable fuel to be produced and for consumption by 2022, which is retrieved from the U.S. EPA website under RFS Program on Apr. 28, 2017.

The RFS2 has also added explicit definitions for renewable fuels to qualify as renewable biomass, to reduce greenhouse gas (GHG) emissions by certain percentage, to improve vehicle efficiency, and to be cleaner, lower-carbon fuels. The EPA created a Lifecycle analysis, which may be referred to as fuel cycle or well-to-wheel analysis. The Lifecycle analysis is to assess the overall GHG impacts of a fuel, including each stage of its production and use. EPA's Lifecycle analysis includes significant indirect emissions as required by the Clean Air Act.

Other efforts have focused on establishing a national low carbon fuel standard (LCFS) together. The LCFS includes all types of transportation fuels (i.e., electricity, natural gas, hydrogen, and biofuels), requires reducing a fuel's average life-cycle GHG emissions or carbon-intensity (CI) over a certain period of time, and stimulates innovation by rewarding production facilities that reduce GHG or carbon emissions at every step. Production facilities can reduce CI of fuels by selling more low-carbon fuels, reducing the CI of fossil fuels, improving efficiencies, reducing carbon footprints, capturing and sequestering carbon, and/or purchasing credits from other producers who are able to supply low-carbon fuels at lower prices. California and some countries have adopted the LCFS policy. Other states and regions in the U.S. are considering adopting a LCFS policy similar to California's model.

A national LCFS would affect the economy and environment. These effects may be based on cost and availability of low-carbon fuels, GHG timeline reduction, and creation of a credit system. Advantages of incorporating LCFS to RFS2 are to reduce transportation fuel consumption and lower fuel prices, lower crop prices by shifting toward cellulosic feedstocks, and reduce GHG or carbon emissions significantly domestically and globally. Thus, production facilities are seeking ways to implement LCFS on their own.

It is desirable to find methods to reduce GHG emissions and/or to reduce CI, which includes finding more efficient technologies. For instance, there are known techniques to separate solids from liquids in process streams. However, these techniques are not very efficient. For instance, one method uses gravity separation with the process streams to separate and to recover various components. Problems are that gravity separation may not separate components very well and requires a long time.

Other methods may not adequately separate solids from liquids in the process streams, are very expensive to operate, require frequent maintenance and repair, and require a higher skill set to operate and to maintain. The process streams may contain high amounts of solids that cause fouling of the evaporators. Also, the solids may have high moisture content, which increases the operating costs to transport and to dry the solids downstream. The equipment may create high levels of emissions from the plants, as well as increase capital and operating costs. Moreover, none of the above methods may be easily integrated into a production facility or capitalize on producing products and feed products.

Accordingly, there are needs for separating desirable solids from liquids in an efficient manner and to increase value in animal feed products produced from the production facilities. The methods described are improved mechanisms for separating components in a whole stillage process stream or a defiber process stream and creating animal feed products having high protein content that is greater than 45% in a more efficient manner.

SUMMARY

This disclosure describes methods for separating components in a whole stillage process stream or a defiber process stream by enhancing solid-liquid separation and recovering the components to produce valuable animal feed products, while improving overall efficiency. This disclosure helps to reduce an amount of energy needed for downstream processing, which in turn reduces GHG or carbon emissions, decreases the amount of energy used for downstream processing and reduces operating costs and/or reduces capital costs, which in turn may lower biofuel costs. This technology may be referred to as Feed Optimization Technology (FOT), in separating components in a whole stillage process stream and/or a defiber process stream.

In an embodiment, a method separates solids from liquids, by separating components in a defiber process stream through a first separation device and through a second separation device to create solids of a first wet cake and liquids of a first liquid stream; diluting the first wet cake in a mixing tank to create a combined stream; and separating components in the combined stream through a third separation device and through a fourth separation device to create solids of a second wet cake and liquids of a second liquid stream.

In another embodiment, a method for creating high protein feed product, the method including receiving a defiber process stream; sending the defiber process stream in a first pass through two separation devices to create a first wet cake material and a first liquid stream; adding a component to the first wet cake material to create a combined process stream; and sending the combined process stream in a second pass through another two separation devices to create a second wet cake material and a second liquid stream.

In yet another embodiment, a method for creating feed products, includes sending a defiber process stream through a first separation device to create a first wet cake material and a first liquid stream; spraying water on the first wet cake material for displacement washing; and sending displaced process stream through a second separation device to create a second wet cake material and a second liquid stream.

In an embodiment, an animal feed product includes protein content greater than 45% on a dry matter basis, and methionine ranging from approximately 1% to 2%.

In yet another embodiment, an animal feed product includes protein content ranging from approximately 47% to approximately 62% on a dry matter basis, and lysine ranging from approximately 1% to 2%.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other aspects and advantages of the claimed subject matter will be apparent from the following Detailed Description of the embodiments and the accompanying figures.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. The features illustrated in the figures are not necessarily drawn to scale, and features of one embodiment may be employed with other embodiments or features may not be employed in all embodiments as the skilled artisan would recognize, even if not explicitly stated herein.

DETAILED DESCRIPTION

Overview

Figure 1:
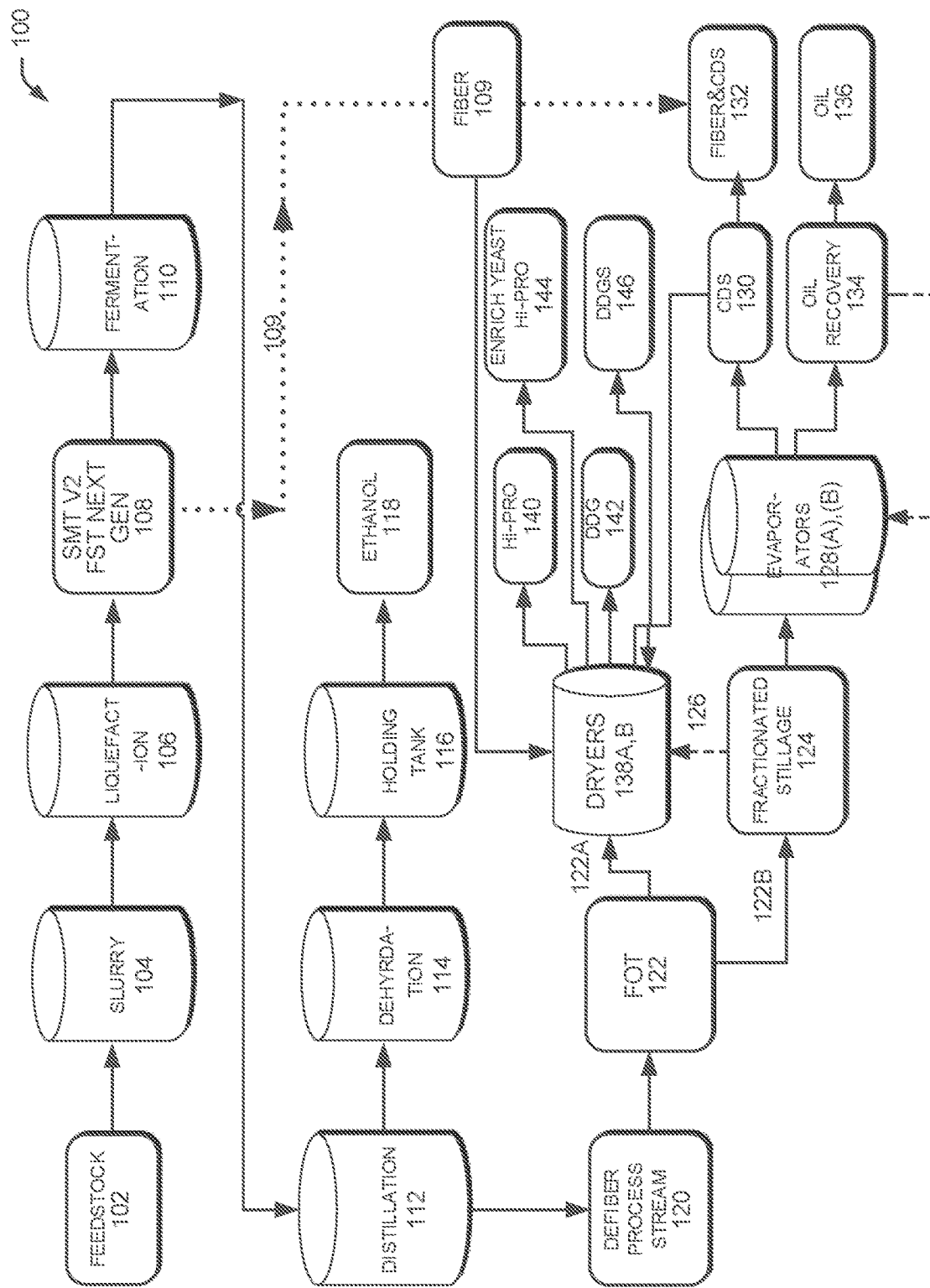
FIGS. 1-5 illustrate example environments using Feed Optimization Technology (FOT) process to produce animal feed products in a production facility.

The Detailed Description explains embodiments of the subject matter and the various features and advantageous details more fully with reference to non-limiting embodiments and examples that are described and/or illustrated in the accompanying figures and detailed in the following attached description. Descriptions of well-known components and processing techniques may be omitted so as to not unnecessarily obscure the embodiments of the subject matter. The examples used herein are intended merely to facilitate an understanding of ways in which the subject matter may be practiced and to further enable those of skill in the art to practice the embodiments of the subject matter. Accordingly, the examples, the embodiments, and the figures herein should not be construed as limiting the scope of the subject matter.

This disclosure describes environments and techniques for the FOT processes by separating solids from liquids in a process stream, which may be obtained from a production facility in a dry grind process and/or a wet milling process. For instance, the production facility may include, but is not limited to, biofuels, alcohol, animal feed, oil, biodiesel, pulp and paper, textile, chemical industry, and other fields. Removal of liquids from the solids will increase the concentration of solids in downstream process streams, enhance more efficient solid-liquid separation to recover components that may be used for valuable animal feed product, and allow more efficient drying for downstream processing. Furthermore, the FOT process concentrates the protein in the process stream to percentages ranging from 45% to 50%, which may be sold alone or may be combined with a yeast product to create enriched yeast animal feed product.

The FOT process presents opportunities to reduce GHG or carbon emissions by providing methods to produce solids having less moisture or higher solids content than conventional methods. With the solids having less moisture or higher solids content, the process may reduce energy usage downstream for drying and/or evaporating and reduce operating costs while improving efficiency in the production facility. For instance, the downstream processing uses electricity and natural gas to operate the evaporators and dryers, which generate emissions into the atmosphere. With the FOT process, the amount of electricity and natural gas to operate the evaporators and dryers would be reduced and so would the amount of emissions.

Furthermore, the FOT process provides biofuels that have a lower carbon intensity than conventional biofuels or hydrocarbon fuels. For instance, the LCFS establishes carbon intensity standard measured in grams $CO_2$ equivalent per mega-joule of fuel energy ($gCO_2e/MJ$) over a certain period of time. The production facilities supply an accounting of net fuel emissions per unit of fuel energy. It appears that the FOT process operates within regulatory agencies that can quantify environmental benefits or associate a biofuel or a tradeable credit. Thus, there are economic incentives, environmental benefits, other advantages, and benefits to using the FOT process that provide a more energy efficient industrial process.

The FOT process produces valuable feed products and co-products. The feed products may include, but are not limited to, a very Hi-Protein product having protein content ranging from 45% to 64%, Enriched Yeast Animal Feed Product, Distiller's Dried Grains (DDG), Condensed Distillers Solubles (CDS), grain distillers dried yeast, syrup with fiber, and the like. The co-products may also include, but are not limited to, corn distillers oil, clarified products, and/or concentrated products.

One embodiment for creating the high protein animal feed product includes separating the components in a process stream by using at least two passes, a first pass with two or more separation devices to create separate solids (i.e., wet cake) from liquids. The process sends the solids to a mixing tank where water is added to dilute the wet cake. The process next sends the diluted mixture through a second pass with two or more separation devices to create a second wet cake, which will be dried having protein content ranging from approximately 46% to approximately 64%.

Embodiments of the FOT process are shown for illustration purposes in the dry grind process. The FOT process may be implemented in wet mill, with steeping, or in the different fields as discussed above. While aspects of described techniques can be implemented in any number of different environments, and/or configurations, implementations are described in the context of the following example processes. There may be fewer equipment, chemicals, enzymes, or processes needed in the subject matter, than shown in the following example process figures.

ILLUSTRATIVE ENVIRONMENTS

FIGS. 1-5 are flow process diagrams showing example environments that may be used with the FOT process. The process may be performed using a combination of different environments and/or types of equipment. Any number of the described environments, processes, or types of equipment may be combined in any order to implement the method, or an alternate method. There may be less or more equipment than shown and may be in any order. Moreover, it is also possible for one or more of the provided steps or pieces of equipment, chemical, enzymes, or other processes to be omitted.

FIG. 1 illustrates an example of a process 100 implementing a series of operations in a dry grind mill of an alcohol production facility. The process 100 in the dry grind mill may operate in a continuous manner. In other implementations, the process 100 may operate in a batch process or a combination of batch and continuous processes.

The process 100 may receive feedstock of a grain that includes, but is not limited to, barley, beets, cassava, corn, cellulosic feedstock, grain, milo, oats, potatoes, rice, rye, sorghum grain, triticale, sweet potatoes, lignocellulosic biomass, wheat, and the like, or pulp. Lignocellulosic biomass may include corn fiber, corn stover, corn cobs, cereal straws, sugarcane bagasse and dedicated energy crops, which are mostly composed of fast growing tall, woody grasses, including, but not limited to, switch grass, energy/forage sorghum, miscanthus, and the like. Also, the feedstock may further include, grain fractions or by-products as produced by industry, such as hominy, wheat middlings, corn gluten feed, Distillers Dried Grains with Solubles, and the like. The feedstock may include, an individual type, a combined feedstock of two types, of multiple types, or any combination or blend of the above grains. The feedstock may include, but is not limited to, one to four different types combined in various percentage ranges. The feedstock may be converted into different types of products and co-products that may include, but is not limited to, ethanol, syrup, distillers oil, distillers dried grains, distillers dried grains with solubles, condensed distillers solubles, wet distillers grains, and the like. In this application, there will be pounds of high protein animal feed products, enrich yeast product, and other types of products. For instance, a bushel of corn may produce about 17-19 pounds of ethanol, about 17-18 pounds of DDGS, and 17-18 pounds of carbon dioxide. The carbon dioxide can be captured and compressed into liquid carbon dioxide or dry ice for commercial applications.

For brevity purposes, the process 100 of using a single stream of feedstock will be described with reference to FIG. 1. As an example, corn may be used as a single feedstock in the dry grind process. Corn may be broken down into its major components of endosperm, germ, bran, and tip cap. Each of these major components may be further broken down to their smaller components. The endosperm, the germ, the bran, and the tip cap each contains varying amounts of starch, protein, oil, fiber, ash, sugars, etc. For example, the amounts of the components in corn may include, but are not limited to, about 70 to 74% starch, about 7 to 9% protein, about 3 to 4% oil, about 7 to 9% fiber, about 1 to 2% ash, about 1 to 2% sugars, and others.

One skilled in the art understands that inspecting and cleaning of the corn occurs initially. At feedstock 102, the process 100 initially grinds the feedstock 102 into a meal, a powder, or a flour to achieve an appropriate particle size. The process 100 may grind the feedstock 102 by using hammer mills or roller mills. This grinding serves to break an outer coating of the corn kernel and increases a surface area to expose starch for penetration of water in cooking. This initial grinding of the feedstock 102 affects the particle size further down the processes. This is critical to have a good grind profile, not too fine particle sizes.

In an embodiment, the process 100 grinds the feedstock 102 with a #8 hammer mill (not shown) to create a meal, a powder, a flour or a ground material having average particle sizes. The hammer mill is a cylindrical grinding chamber with a rotating drum, flat metal bars, and a screen. The screen size may be, but is not limited to, $4/64$ to $12/64$ inch-hole sizes. An example hammer mill may have screen openings that are sized $7/64$ inch, or about 2.78 millimeters (mm) to create small particles that are sized about 0.5 to about 2-3 mm.

In another embodiment, the process 100 grinds the feedstock 102 with a roller mill (not shown) to create a meal, a powder, a flour or a ground material. The roller mill receives the feedstock 102, sends the feedstock 102 between two or more rolls or wheels, and crushes the feedstock 102 to create ground material. One roll may be fixed in position while the other roll may be moved further or closer towards the stationary roll. The roll surfaces may be grooved to help in flaking of the corn. The example rolls may be about 9 to about 12 inches (23 to 30.5 cm) in diameter, with a ratio of length to diameter that may be about 4:1. The small particles may be sized about 0.5 to about 2-3 mm.

The process 100 sends the ground material to slurry 104. Next, the process 100 adds water, backset, and enzymes to the feedstock 102 that has been ground to create a slurry 104 in this tank. In an example, the process 100 adds a liquefying enzyme, such as alpha-amylase to this mixture. The alpha-amylase enzyme hydrolyzes and breaks starch polymer into short sections, dextrins, which are a mix of oligosaccharides. The process 100 maintains a temperature between about 60° C. to about 100° C. (about 140° F. to about 212° F., about 333 K to about 373 K) in the slurry 104 to cause the starch to gelatinize and a residence time of about 30 to about 60 minutes to convert insoluble starch in the slurry to soluble starch. The slurry may have suspended solids content of about 26% to about 40%, which includes starch, fiber, protein, and oil. Other components in the slurry 104 may include, grit, salts, and the like, as is commonly present on raw incoming grain from agricultural production, as well as recycled waters that contain acids, bases, salts, yeast, and enzymes. The process 100 adjusts the pH of the slurry to about 4.5 to 6.0 (depending on enzyme type) in the slurry 104.

In an embodiment, the slurry may be heated to further reduce viscosity of the ground grain. The parameters include heating for longer periods and/or at higher temperatures. In some embodiments, there may be two or more slurry tanks used for an additional residence time and a viscosity reduction.

In an embodiment, the process 100 pumps the slurry to jet cookers (not shown) to cook the slurry. Jet cooking may occur at elevated temperatures and pressures. For example, jet cooking may be performed at a temperature of about 104° C. to about 150° C. (about 220° F. to about 302° F.) and at an absolute pressure of about 1.0 to about 6.0 kg/cm$^2$ (about 15 to 85 lbs/in$^2$) for about five minutes. Jet cooking is another method to gelatinize the starch.

The process 100 sends the slurry to liquefaction 106, which converts the slurry to mash. The process 100 uses a temperature range of about 80° C. to about 150° C. (about 176° F. to about 302° F., about 353 K to about 423 K) to hydrolyze the gelatinized starch into maltodextrins and oligosaccharides to produce a liquefied mash. Here, the process 100 produces a mash stream, which has about 26% to about 40% total solids content. The mash may have suspended solids content that includes protein, oil, fiber, grit, and the like. In embodiments, one or more liquefaction tanks may be used in liquefaction 106.

The process 100 may add another enzyme, such as glucoamylase in the liquefaction 106 to break down the dextrins into simple sugars. Specifically, the glucoamylase enzyme breaks the short sections into individual glucose. The process 100 may add the glucoamylase enzyme at about 60° C. (about 140° F., about 333 K) before fermentation starts, known as saccharification, or at the start of a fermentation process. In an embodiment, the process 100 further adjusts the pH to about 5.0 or lower in the liquefaction 106. In another embodiment, saccharification and fermentation may also occur simultaneously.

At liquefaction 106, the process 100 obtains the process stream or a mixture from the slurry 104. In other embodiments, the process 100 may obtain a process stream or mixture as slurry from a slurry tank, from a jet cooker, from a first liquefaction tank, from a second liquefaction tank, or after a pretreatment process in cellulosic production facility.

For illustrative purposes in FIG. 1, SMT V2 FST NEXT GEN 108 is presented at a high level in a front end of the production facility. SMT V2 refers to technology name of Selective Milling Technology V2 process and FST NEXT GEN refers to technology name of Fiber Separation Technology Next Gen process. Details of embodiments of the processes for patented SMT V2 FST NEXT GEN will be discussed later with reference to FIG. 6. The process in SMT V2 FST NEXT GEN may be included with any process as part of the dry grind process or any type of process in a production facility. Specifically, SMT V2 FST NEXT GEN helps to increase starch recovery from grain and to remove the fiber, shown as dotted line 109 before sending it to fermentation 110. The process sends the fiber 109 to feed area, avoiding fermentation, distillation, dehydration, and drying (i.e., some back end processes).

At liquefaction 106, SMT V2 FST NEXT GEN 108 obtains the process stream or a mixture from the slurry 104. In other embodiments, the SMT V2 FST NEXT GEN may obtain the process stream or mixture as slurry from a slurry tank, from a jet cooker, from a first liquefaction tank, from a second liquefaction tank, or after a pretreatment process in cellulosic production facility.

At fermentation 110, the process 100 adds a microorganism to the mash for fermentation in a tank 110. The process 100 may use a common strain of microorganism, such as Saccharomyces cerevisiae to convert the simple sugars (i.e., maltose and glucose) into alcohol with solids and liquids, $CO_2$, and heat. The process 100 may use a residence time in fermentation 110 as long as about 50 to about 60 hours. However, variables such as a microorganism strain being used, a rate of enzyme addition, a temperature for fermentation, a targeted alcohol concentration, and the like, may affect fermentation time. In embodiments, one or more fermentation tanks may be used in the process 100.

The process 100 creates alcohol, solids, liquids, microorganisms, and various particles through fermentation 110. Once completed, the mash is commonly referred to as beer, which may contain about 10% to about 20% alcohol, plus soluble and insoluble solids from the grain components, microorganism metabolites, and microorganism bodies. The microorganism may be recycled in a microorganism recycling step, which is an option. The part of the process 100 that occurs prior to distillation 112 may be referred to as the "front end", and the part of the process 100 that occurs after distillation 112 may be referred to as the "back end".

Turning to distillation 112, the process 100 distills the beer to separate the alcohol from the non-fermentable components, solids and the liquids by using a distillation process, which may include one or more distillation columns, work with beer columns, side stripper, and the like. The process 100 pumps the beer through distillation 112, which is boiled to vaporize the alcohol or produce concentrated stillage. The process 100 condenses the alcohol vapor in distillation 112 where liquid alcohol exits through a top portion of the distillation 112 at about 90% to about 95% purity ethanol, 5% water which is about 190 proof. In embodiments, the distillation columns and/or beer columns may be in series or in parallel.

At dehydration 114, the process 100 removes any moisture from the 190 proof alcohol by going through dehydration. The dehydration 114 may include one or more drying column(s) packed with molecular sieve media to yield a product of nearly 100% alcohol, which is 200 proof alcohol.

At holding tank 116, the process 100 adds a denaturant to the alcohol. Thus, the alcohol is not meant for drinking, but to be used for motor fuel purposes. At 118, an example product that may be produced is ethanol, to be used as fuel or fuel additive for motor fuel purposes.

Turning to distillation 112, the water-rich product remaining is now referred to as a defiber process stream 120, which may include but is not limited to, starches, soluble organic and inorganic compounds, suspended solids containing protein, carbohydrate, dissolved solids, water, oil, fat, protein, minerals, acids, bases, recycled yeast, non-fermented carbohydrates, by-products, small amount of fiber, and the like. Defiber is defined as having a minimum or small amount of fiber. The defiber process stream 120 falls to the bottom of the distillation 112 and passes through FOT 122 (Feed Optimization Technology) process to create a high protein feed product.

For illustrative purposes in FIG. 1, FOT 122 is presented at a high level in a back end of the production facility. Details of embodiments of the processes for FOT 122 will be discussed later with reference to FIGS. 7-9. The process in FOT 122 may be included with any process as part of the dry grind process or any type of process, steep process, or wet milling in a production facility. Specifically, FOT 122 helps to create a high protein animal feed product and other products that may be sold.

The liquid stream 122B from FOT 122 may need further processing due to its total solids composition. The liquid stream 122B could contain high amounts of suspended solids. Thus, the liquid stream 122B may contain high amounts of suspended solids that may cause efficiency problems in the evaporators. Furthermore, this processing step of evaporating to concentrate solids in high water content streams requires a significant amount of energy. Thus, the amount of energy required increases the operating costs. The evaporator capacity may be a bottleneck in the plant. The process 100 sends this liquid stream 122B to Fractionated Stillage 124 for further processing.

For illustrative purposes in FIG. 1, Fractionated Stillage 124 is presented at a high level here, shown in the back end of the production facility. Details of embodiments of Fractionated Stillage 124 will be discussed with reference to FIGS. 10 and 11. Fractionated Stillage 124 may be included with any process as part of the dry grind process or any type of process in a production facility. Specifically, Fractionated Stillage 124 helps to improve the separation of solids from liquids in an efficient manner, improve evaporator operation, increase throughput, provide feed streams for further processing to produce valuable animal feed products and/or oil, and to reduce GHG or carbon emissions. Other embodiments may include Fractionated Stillage 124 process being located after whole stillage or after any of the evaporators (i.e., after one, two, three, last, and the like).

The process 100 sends a liquid stream from Fractionated Stillage 124 to the evaporators 128(A)(B) to boil away liquids from this stream. This creates a thick syrup, condensed distillers solubles, CDS 130 (i.e., about 25% to about 50% dry solids), which contains soluble or dissolved solids, suspended solids (generally less than 50 μm) and buoyant suspended solids from fermentation.

The evaporators 128(A),(B) may represent multiple effect evaporators, such as any number of evaporators, from one to about twelve evaporators. Some process streams may go through a first effect evaporator(s) 128(A), which includes one to four evaporators and operates at higher temperatures, such as ranging to about 210° F. (about 99° C. or about 372 K). While other process streams may go through a second effect evaporator(s) 128(B), which operates at slightly lower temperatures than the first effect evaporator(s) 128(A), such as ranging from about 130° F. to about 188° F. (about 54° C. to about 87° C. or about 328 K to about 360 K). The second effect evaporator(s) 128(B) may use heated vapor from the first effect evaporator(s) 128(A) as heat or use recycled steam. In other embodiments, there may be three or four effect evaporator(s), which operate at lower temperatures than the second effect evaporator(s). In embodiments, the multiple effect evaporators may range from one effect up to ten effects or more. This depends on the plants, the streams being heated, the materials, and the like. In embodiments, the evaporators may be in series or in parallel.

The process 100 sends the CDS 130 (AAFCO 2017 Official Publication at 27.7) from the evaporators 128(A), (B) to become combined with the fiber 109 (AAFCO 2017 Official Publication at 48.2) from SMT FST NEXT GEN 108 to produce Fiber&CDS 132 as a product. This may also be referred to as fiber&syrup.

In another embodiment, the process 100 sends the syrup, which is concentrated having about 20% to about 45% by weight of total solids, to be sold as CDS 130 (AAFCO 2017 Official Publication at 27.7). This may be sold at a very low price. The CDS 130 may contain fermentation by-products, moderate amounts of fat, spent yeast cells, phosphorus, potassium, sulfur and other nutrients. The moisture content for the CDS 130 may range from about 55% to about 80%.

In another embodiment, the process 100 may send a stream from the evaporators 128(A),(B) to a process for oil recovery 134, which removes oil from Fractionated Stillage 124 to recover oil. As a result, the process 100 produces a product of oil 136 of back-end oil and solids. The process 100 may send solids, water, and the like from the oil recovery 134 back to the evaporators 128(A),(B) for further processing.

Returning to FOT 122, the process sends a cake stream 122A to the dryers 138A,B. The dryers 138A,B are dryers for removing moisture from the feed products. The dryers 138A,B may include one or multiple dryers, which are not limited to, a rotary drum dryer, a steam tube dryer, a scrape surface rotary contact dryer, a flash dryer, a ring dryer, a thin film steam dryer, a spray dryer, a freeze dryer, and the like.

The process 100 dries these materials to create a very high protein product, Hi-Pro 140 having protein content ranging from approximately 46% to approximately 64% dry basis. The process 100 may receive a yeast enriched stream 126 from Fractionated Stillage 124 to be combined with material from FOT 122 to create an Enrich Yeast Hi-Pro 144, which is dried animal feed product, that is yeast enriched and has high protein over 46%. The yeast may be approximately 25% based on mass balance calculations. The process 100 also blends fiber and syrup from SMT V2 FST NEXT GEN 108 and some very high protein from Hi-Pro 140 together to achieve 26% protein content for DDG 142. The process 100 combines individual ingredients of fiber 109 from SMT V2 FST NEXT GEN 108, CDS 130 from the evaporators 128(A),(B), very high protein Hi-Pro 140 from FOT 122 and yeast cake 126 from Fractionated Stillage 124 to create DDGS 146. For brevity purposes, the products produced will use similar names and identifiers in the following figures, but may be produced from different processes or equipment.

In the process 100, enzymes may be added in a single step or in multiple steps at different process locations to process streams (not shown). The enzymes will solubilize fiber with minimal impact to protein solubilization and/or protein precipitation to achieve oil and fiber removal from insoluble protein in the centrifugal process.

Figure 2:
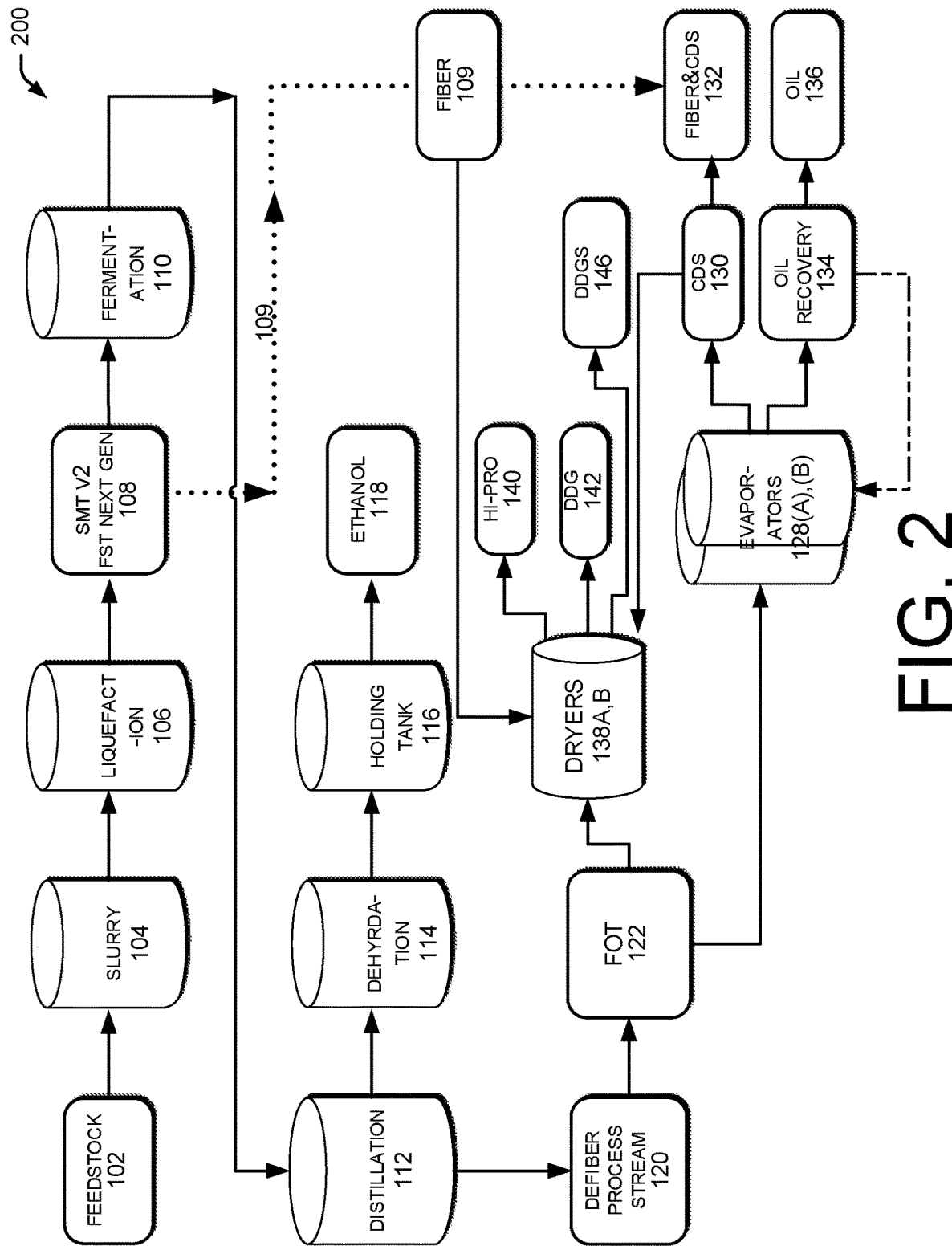

FIG. 2 is similar to FIG. 1, except this figure illustrates another embodiment of the process 200 with FOT 122. Without Fractionated Stillage 124, there will be fewer products produced by FOT 122 as shown in FIG. 2 than in FIG. 1.

Figure 3:
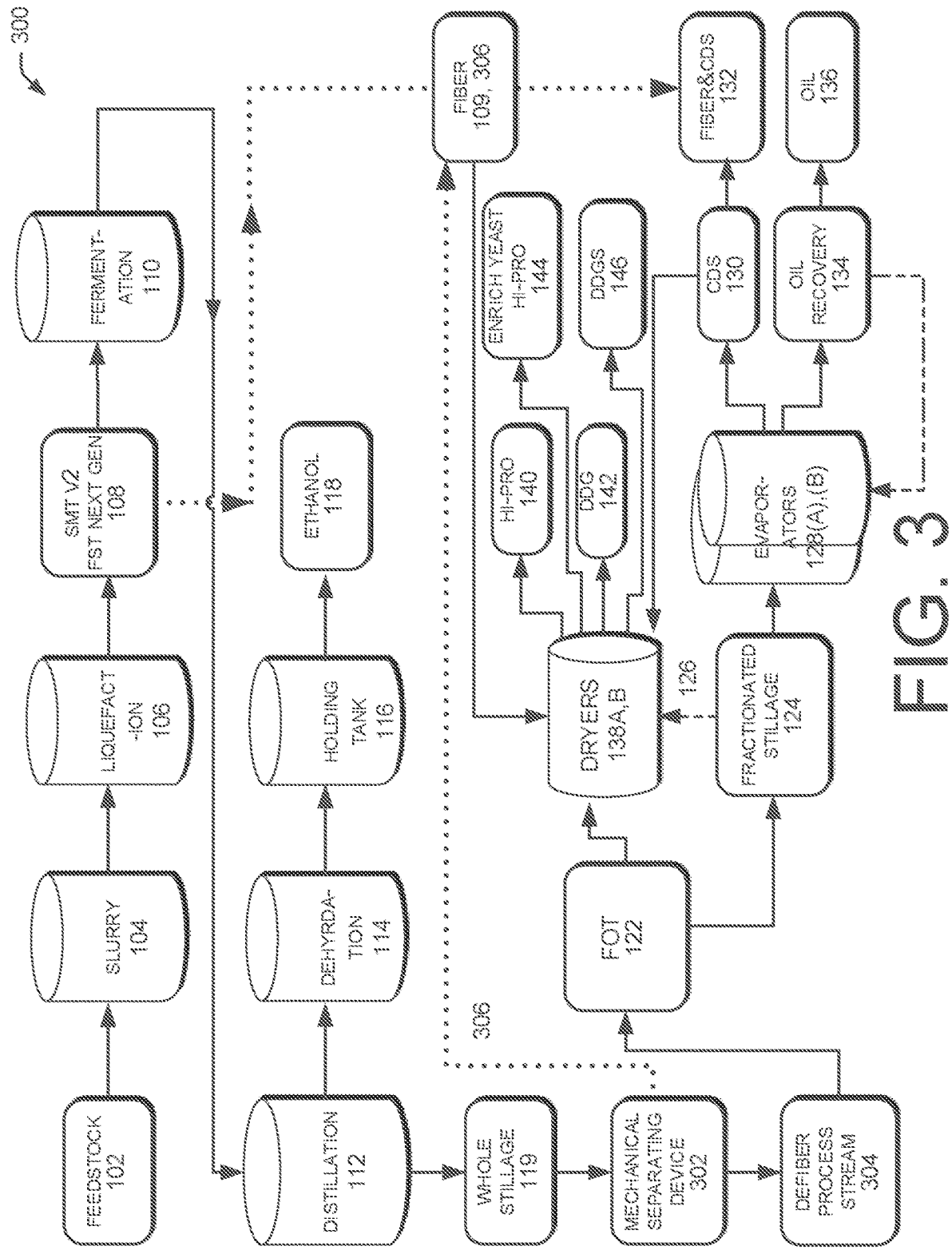

FIG. 3 is similar to FIG. 1, except this figure illustrates another embodiment of the process 300. Details that are not similar to FIG. 1 will be discussed below with reference to FIG. 3. The process 300 shows a mechanical separating device 302 with FOT 122 process. The mechanical separating device 302 may be inserted as an example, after whole stillage 119, or could be in other process locations.

The mechanical separating device 302 may further screen out finer fiber, small sized particles that may slip through the process SMT V2 FST NEXT GEN 108 to create a more refined, defiber process stream 304. The mechanical separating device 302 may improve fiber capture, and may further increase protein and starch component weight/weight dry matter mass in a filtrate. For example, the mechanical separating device 302 may capture fiber, shown in dotted line 306 to be combined with the fiber 109 from SMT V2 FST Next Gen 108 and sold as Fiber&CDS 132.

The mechanical separating device 302 that may be used, includes, but is not limited to, a pressure screen, a DSM screen, a multi-zoned screening apparatus, a paddle screen, Russel Finex, fine Fournier press screen, or any type of fine screening apparatus could be used to exclude particulate size from passing into the filtrate. The DSM screens may be a metal wedge wire screen or with round hole. MZSA and/or paddle screens use wedge wire or round hole metal screens. Russel Finex is typically a polymeric screen. The mechanical separating device 302 will screen out particles relevant to the screen size to separate any particles that will tear up the screen.

Experiments have been conducted using 600 um sieve pans, which increased the amount of protein by 14-18% relative or about 4% w/w dry protein in the final Hi-Pro 140. The captured fiber content from the 600 um sieve screen had approximately 30% protein w/w dry matter in the substrate after copious amount of washing with hot water. Experiments were also conducted using metal sieve pan screens in the laboratory.

In another experiment, smaller screens may increase the fine fiber capture and increase the Hi-Pro product protein concentration, diverting desirable protein mass. One sample was screened, washed with water, and centrifuged to form a washed cake. It was solvent extracted in the laboratory. The sample was analyzed to be 78% protein w/w dry matter.

Figure 4:
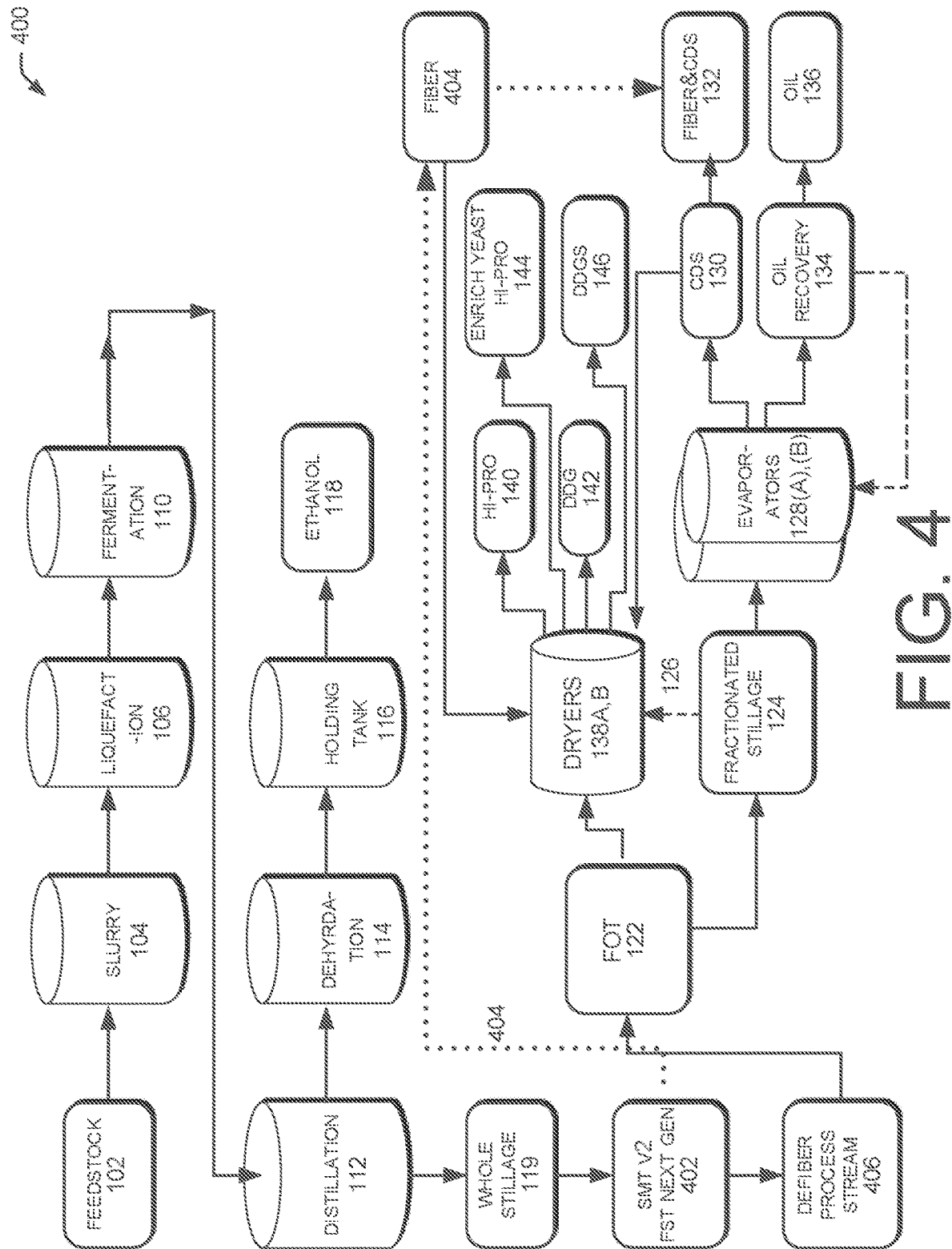

FIG. 4 is similar to FIG. 1, except this figure illustrates another embodiment of the process 400. SMT V2 FST NEXT GEN 402 occurs in the back end of the process 400 after whole stillage 119. SMT V2 FST NEXT GEN 402 will separate out the fiber 404 to be combined with syrup to create Fiber&CDS 132 and the process 400 will create the defiber process stream 406 to be used in the FOT™ process.

Figure 5:
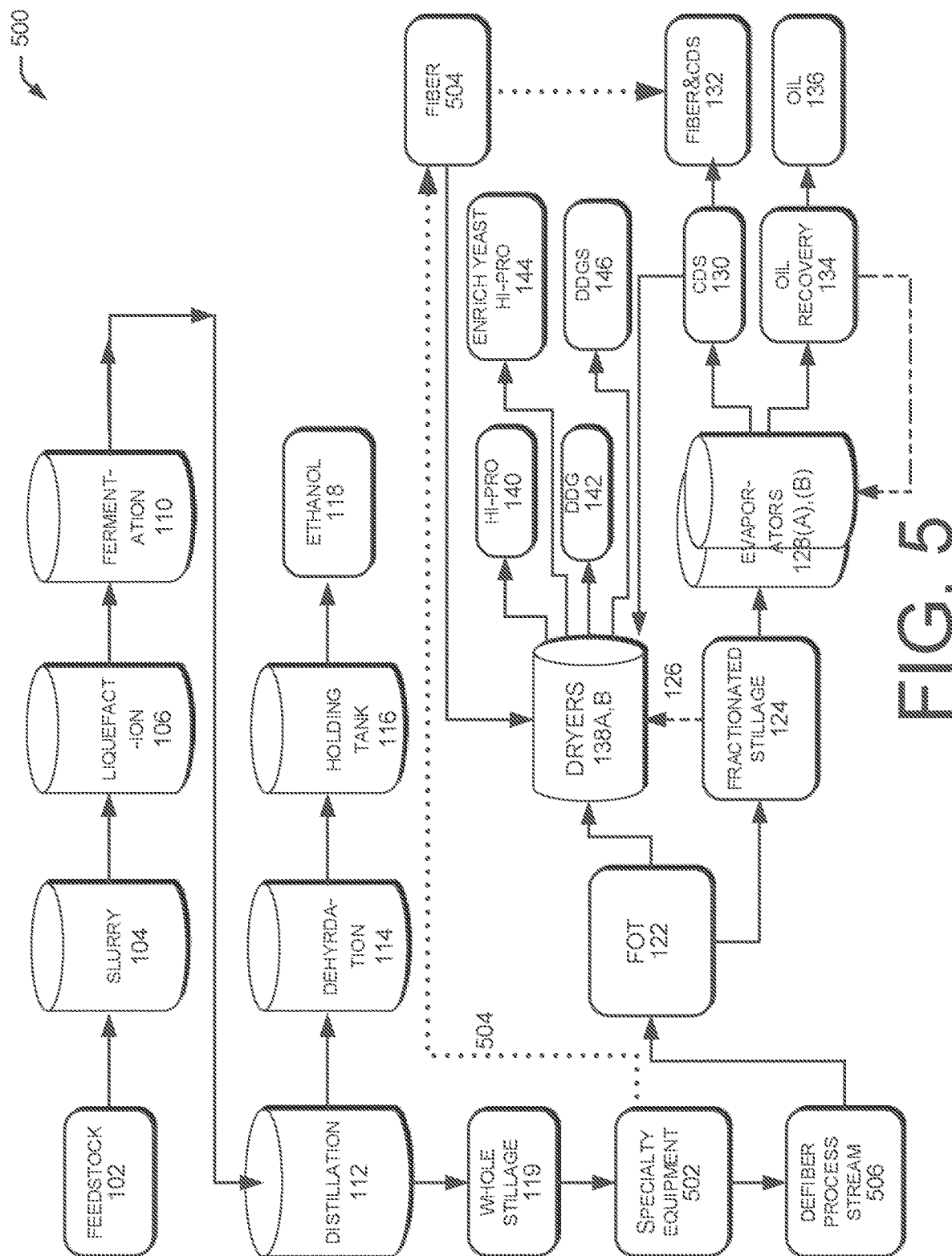

FIG. 5 is similar to FIG. 4, except this figure illustrates another embodiment of the process 500. Details that are not similar to FIG. 4 will be discussed below with reference to FIG. 5. Specialty equipment 502 occurs in the back end of the process 500 after whole stillage 119. The specialty equipment 502 may be used to further separate the components in the process stream. For instance, the specialty equipment 502 may include, but is not limited to, a multi-zoned screening apparatus (MZSA), a paddle screen, a rotary press, any combination of the equipment, and the like.

In an embodiment, this process 500 may use the specialty equipment 502, such as the MZSA to dewater and to separate the components in the whole stillage 119 and to send the process stream to the rotary press to remove the fiber 504. The process 500 sends the fiber 504 to be combined with the CDS 130 to create Fiber&CDS 132 and creates a defiber process stream 506 to be used in the FOT 122 process. The MZSA is described in U.S. Pat. No. 9,718,006, entitled "Multi-Zoned Screening Apparatus" and in Pat. Application Publication No. 20190374883, entitled "Mechanical Separation Device", both are incorporated by reference in their entireties.

In another embodiment, instead of the MZSA, it may be a paddle screen to dewater and to separate the components in the process stream. The paddle screen may be used with the rotary press.

Example of SMT V2 FST Next Gen Processes

Figure 6:
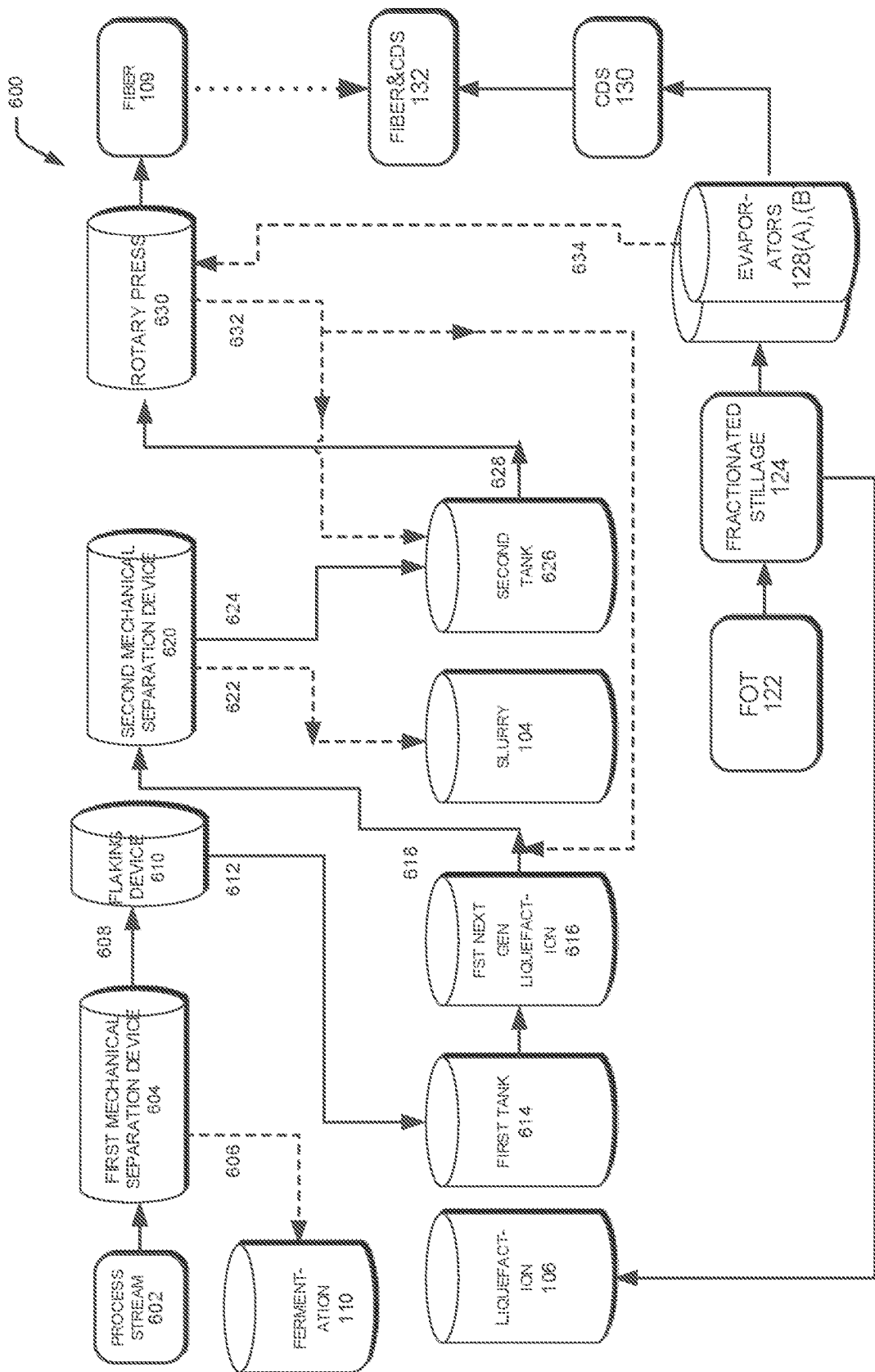
FIG. 6 illustrates an example of SMT V2 and FST Next Gen to increase starch recovery and to separate the fiber from the process stream while increasing capacity, used with the FOT process.

FIG. 6 is an example of the SMT V2 FST NEXT GEN 600 process with FOT 122. The SMT V2 FST NEXT GEN process is fully described in U.S. Pat. No. 9,376,504 and U.S. Pat. Application Publication No. 20170145377, entitled "Hybrid Separation", both are incorporated by reference herein in their entireties. The process 600 sends a process stream 602 through a first mechanical separation device 604. The process 600 produces a liquids and fine suspended particles stream 606 and a large suspended solids stream 608. The process 600 sends smaller sized particles, such as the liquids and fine suspended particles stream 606 to fermentation 110. However, the larger sized particles, such as the large suspended solids stream 608 may still contain starch, fiber, and/or the food grade protein. Thus, the process 600 may flake and wash the starch from the fiber through a flaking device 610 combined with a series of mechanical separation devices. Any type of device may be used. For instance, the process 600 may include one or more flaking devices that provide different amounts of flaking.

The mechanical separation device includes, but is not limited to, paddle screen, MZSA, pressure screen, DSM screen and the like. The flaking device includes, but is not limited to, roller mill, centrifugal pump, ventri jet, hydroheater, and the like. Other devices that mill, such as pin mill, impact mill or disc mill may also be used to grind the particles, rather than flake the particles. In an embodiment with a roller mill, one roll may be fixed in position while the other roll may be moved further or closer towards the stationary roll. The two roll surfaces may be smooth or grooved to help in flaking of the particles. There may be one, two, or more sets of roller mills used to flake the particles.

The process 600 sends the flaked suspended solids stream 612 to a first tank 614. The process 600 sends liquids from backset, condensate, thin stillage, and the like to the first tank 614. The first tank 614 sends the stream to FST NEXT GEN liquefaction tank 616, which sends the stream 618 to a second mechanical separation device 620, which receives a portion of liquids and fine suspended particles stream 632 from a rotary press 630.

The process 600 sends the stream 618 to a second mechanical separation device 620 to create liquids 622 to slurry 104 and solids to a second tank 626, which is mixed with a portion of liquids and fine suspended particles stream 632 from a rotary press 630. In the second tank 626, the combined streams are mixed and heated to about 76° C. to about 85° C. (170° F. to about 185° F., about 349 K to about 338 K) for about 1 to about 60 minutes. In an embodiment, the combined streams are mixed and heated to about 82° C. (180° F., about 355 K) for about 5 minutes. The process 600 sends this combined stream 628 from the second tank 626 to the rotary press 630.

The rotary press 630 separates out the fiber 109, which is combined with CDS 130 to create Fiber&CDS 132. The rotary press process is fully discussed in U.S. patent application Ser. No. 10/260,031B2, entitled "Optimized Dewatering Process For an Agricultural Production Facility", which is incorporated by reference herein in its entirety. As shown, streams from FOT 122 and Fractionated Stillage 124 and the stream 634 from the evaporators 128(A),(B) will travel to the rotary press 630. From Fractionated Stillage 124, there may be a stream of backset, condensate, or thin stillage being sent to Liquefaction 106.

The rotary press may be manufactured by Fournier Industries. The rotary press is circular, has multiple channels to dewater the process stream, ranging from two to twelve channels per rotary press. The material is fed at low pressure into the channel and rotates between two parallel revolving stainless steel chrome plated filtering elements. As water passes through the screens, the material continues to dewater as it travels around the channel. The flocculated material builds up solids until enough pressure is generated against the outlet restricted arm.

Examples of FOT Processes

Figure 7:
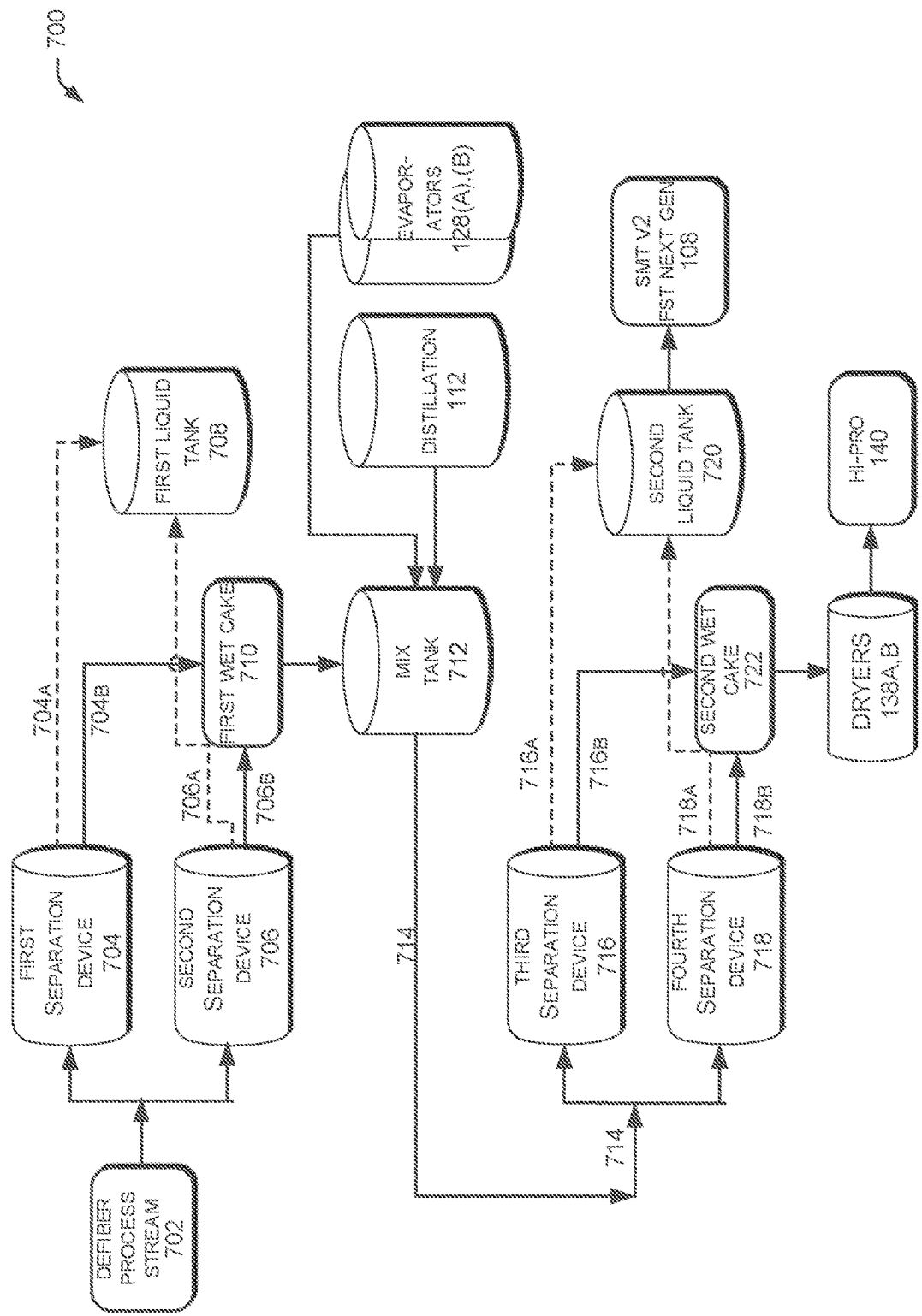
FIGS. 7, 8, and 9 illustrate examples of FOT process with separation devices to separate solids from liquids to create high protein animal feed products and other products.
Figure 8:
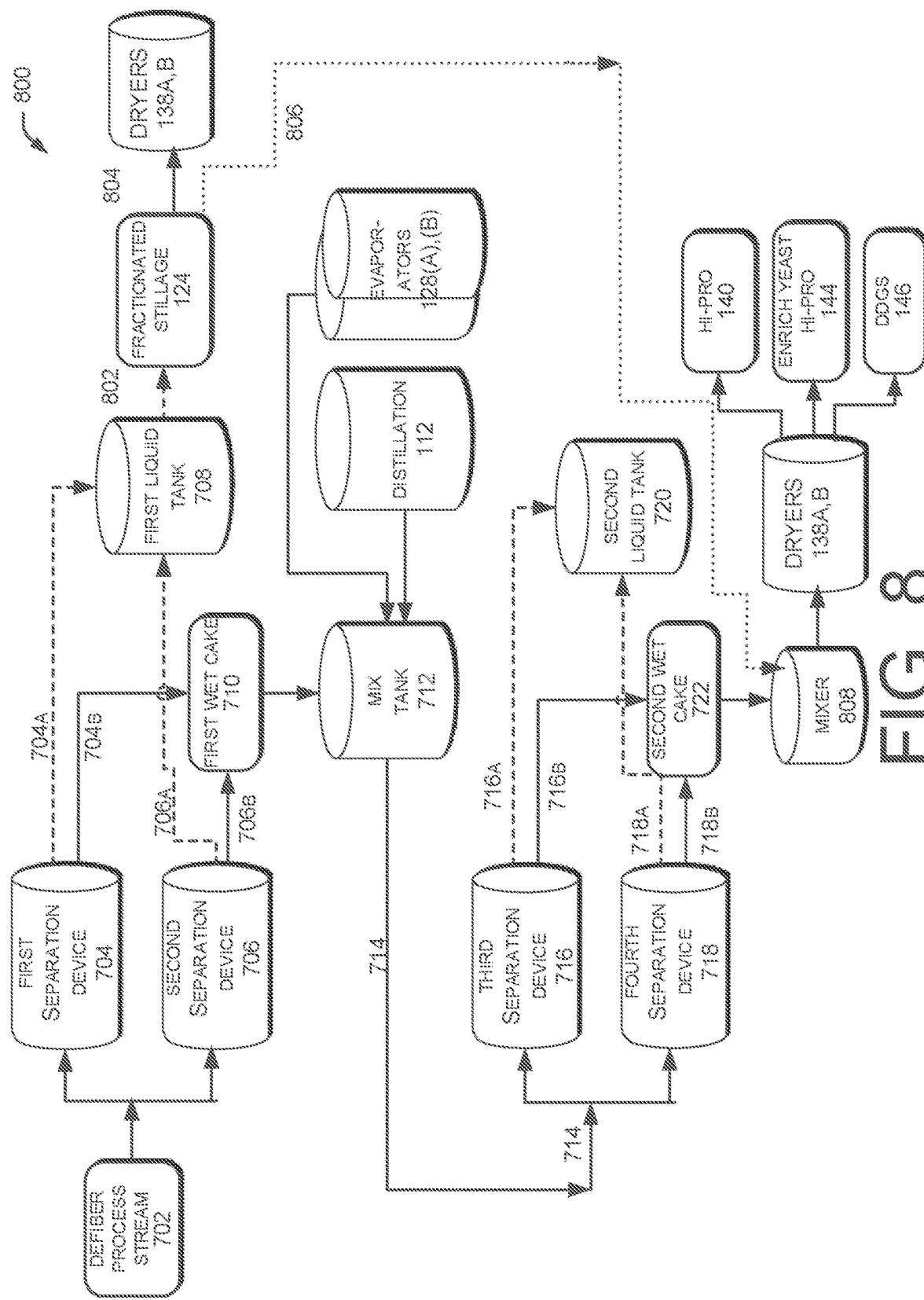
Figure 9:
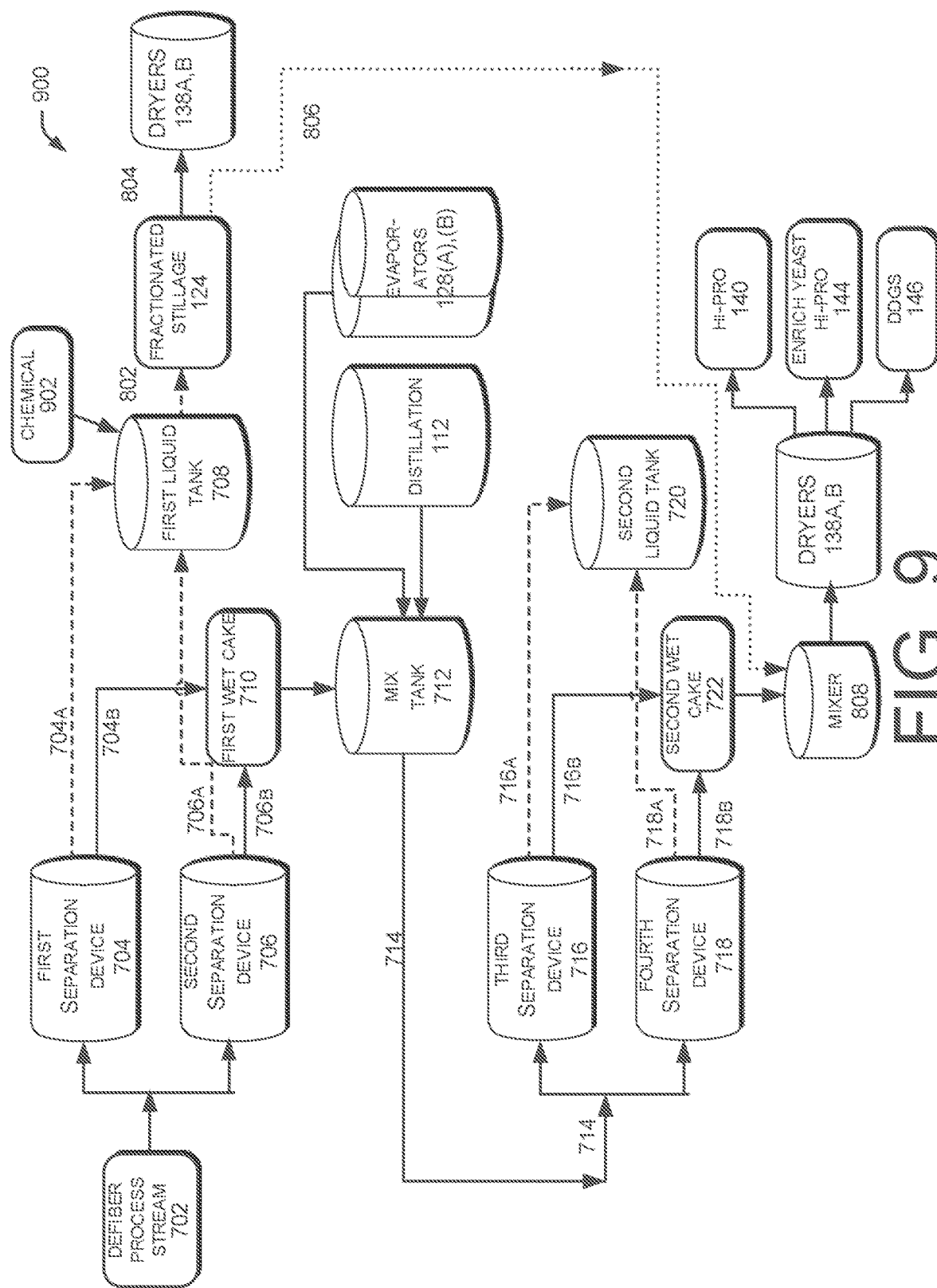

FIGS. 7-9 illustrate examples of the FOT 122 process that may be used with the various environments described in this Specification. FIG. 7 illustrates an embodiment of the process 700 starting with a process stream, such as defiber process stream 702. The defiber process stream 702 may be received from any of the processes shown in FIGS. 1-6. The defiber process stream 702 may be subjected to processes through SMT V2 FST NEXT GEN 108, mechanical separating device, or specialty equipment, which remove the majority of the fiber from the process stream. Other possible starting process streams for FOT 122 may include, but are not limited to, whole stillage, centrate, thin stillage, mid stillage, backset, post liquefaction dilution, syrup, any type of process streams or mixtures in any type of production facilities, and the like.

The defiber process stream 702 may comprise about 4% to about 19% total solids, which may include about 3% to about 9% dissolved solids and about 2% to about 10% suspended solids (i.e., insoluble solids). The amount of fat in the defiber process stream 702 may range from about 8% to about 37% fat and range from around 10% to about 30% protein.

The process 700 may use two or more separation devices in series, in parallel, or a combination. The process 700 may use one separation device in a first pass, another single device in a second pass, another single device in a third pass, may use two separation devices in parallel in a first pass, two separation devices in parallel in a second pass, may use two separation devices in series in a first pass, two separation devices in series in a second pass, and the passes may be in series. Any number of combinations of separation devices, passes, series or parallel may be used. For instance, the process may use one to eight separation devices, any number of passes may be used ranging from one to five, in parallel or in series. These variables depend on the production capacity of the plant.

The process 700 sends the defiber process stream 702 in a first pass to a first separation device 704 to separate liquids 704A, which are sent to a first liquid tank 708 and to separate solids 704B, which are sent to a first wet cake 710 (i.e., insoluble solids such as protein, fiber, fat, and liquids). In parallel, the process 700 also sends the defiber process stream 702 to a second separation device 706 to separate the liquids 706A, which are sent to a first liquid tank 708 and to separate solids 706B, which are sent to a first wet cake 710. The first wet cake 710 includes solids such as wet cake, fat, protein, organics, organic acids, glycerol, and the like. The protein content is believed to be at least 45% at this time. The total solids range from approximately 34% to approximately 47% in 704B.

The process 700 sends the first wet cake 710 to a mix tank 712, which may be approximately 4 to approximately 6 pounds of high protein content, having about 45% to about 48% protein. The mix tank 712 may receive one to four components, such as water, processing aids, chemicals, or enzymes. The addition of these components will wash the components from the first wet cake or dilute the wet cake significantly. For instance, the percent of wet cake will be diluted down or refer to as dilution washing. In another embodiment, the process 700 uses displacement washing by spraying minimum amount of water to wash the solids, which may be followed with centrifugation.

In an embodiment, the process 700 receives the first wet cake 710, receives distillate from distillation 112 and evaporate condensate from evaporators 128(A),(B) into the mix tank 712. The process 700 may retain the combined streams for 1 minute to 240 minutes, may agitate with an agitator or may not require any agitation, may be kept at room temperature or be heated ranging from approximately 180 deg F. to 212 deg F., and could include processing aids or chemicals, which are generally regarded as safe (GRAS) approved in the mix tank 712.

In different embodiments, the water added to the mix tank may include, but are not limited to, clean water from process scrubber (VOC, ethanol, clean water), distillate from distillation, side stripper bottoms, $CO_2$ bottoms, centrate produced from a first separation device, evaporate condensate from evaporator, and the like.

The processing aids or chemicals may include, but are not limited to, polymers, such as synthetic water-soluble polymers, dry polymers, emulsion polymers, inverse emulsion polymers, latex polymers, dispersion polymers, chitin, chitosan, chitinase, chitobiose, chitodextrin, lysozyme, polyacrylamide and its derivatives, or an acrylamide and its derivatives. The polymers have a specific average molecular weight (i.e., chain length) and a given molecular distribution. For instance, polyacrylamides have the highest molecular weight among synthetic chemicals, ranging from about 1 to about 20 million Daltons. There are other polymers with specific properties that may be used under specific conditions include, but are not limited to, polyethylene-imines, polyamides-amines, polyamines, polyethylene-oxide, and sulfonated compounds, and the like. Chitin is a long-chain polymer of N-acetylglucosamine, which is a derivative of glucose. The polymers may carry a positive (i.e., cationic), a negative charge (i.e., anionic), or no charge (i.e., nonionic). Polymers with charges may include, but are not limited to, cationic flocculants, cationic coagulants, anionic coagulants, and anionic flocculants. The cationic (i.e., positive charge) and anionic (i.e., negative charge) polymers may have an ionic charge of about 10 to about 100 mole percent, more preferably about 40 to 80 mole percent. There are mineral flocculants that are colloidal substances, such as activated silica, colloidal clays, and metallic hydroxides with polymeric structure (i.e., alum, ferric hydroxide, and the like). An example is an active modified polyacrylamide. An example may include an acrylamide-acrylic acid resin C6H9NO3 (i.e., hydrolyzed polyacrylamide, prop-2-enamide; prop-2-enoic acid). The enzymes that may be added to the mix tank are described with reference to FIG. 12. Included is a list of different processing aids or enzymes that may help with the protein and other components in the process stream.

Next, the process 700 sends the combined stream 714 from the mix tank 712 to two separation devices in parallel in a second pass. The process 700 sends the combined stream 714 to a third separation device 716 to separate liquids 716A, which are sent to a second liquid tank 720, which are sent further to the SMT V2 FST NEXT GEN 108 process. The process 700 separates the solids 716B, which are sent to a second wet cake 722. At the same time, the process 700 starts and sends in parallel in the second pass, the combined stream 714 to a fourth separation device 718 to separate liquids 718A, which are sent to a second liquid tank 720 and to separate solids 718B, which are sent to the second wet cake 722. The second wet cake 722 includes solids same as wet cake, fat, protein, organics, organic acids, glycerol, and the like. It is believed the protein content at this stage is approximately 46% to approximately 64%. The total solids range from approximately 35% to approximately 45% in 704B.

The process 700 sends the second wet cake through dryers 138A,B to produce a product, very high protein Hi-Pro 140 which has a high protein content ranging from approximately 45% to approximately 62% dry basis. Based on the size of a plant, this second wet cake may be approximately 4 to 6 pounds of material to be dried alone and/or portions may be combined with 1.5 to 2 pounds of product from Fractionated Stillage 124.

The separation device may be any type of dynamic or static mechanical processor that separates out heavier suspended solids from other lighter solids, solids from liquids, and the like by density. The separation device may include, but is not limited to, a multi-zoned screening apparatus, a decanter centrifuge, a sedicanter centrifuge, a tricanter centrifuge, a disk stack centrifuge, a cyclone, a hydrocylcone, a settling tank, and the like. The type of separation device to be used depends on factors, such as type of process streams, liquid and solid goals at start and at end of process, the type of solids, density of materials, desired reduction of carbon intensity, desired reduction of GHG emissions, and the like. Other types of separation devices that may be used include a pressure screen, a screw press, or a rotary vacuum filter. The separation device may increase solids content from about 10% to about 15% total solids to about 25% to about 45% total solids.

In an embodiment, the separation device may be Flottweg's Tricanter® for continuous separation of solids, oil and water from a liquid-solids mixture at adjustable RPMs from 0-4200 based upon machine and feed characteristics. The light phase liquid discharges without pressure by flowing over an internal phase separation disc. The heavy phase liquid discharges under pressure via an automated variable impeller. The variable impeller allows changes to the pond depth inside the machine while it is running.

In another embodiment, the separation device may be Flottweg's Decanter®, which provides centrifugal force between 3,000 and 3,500 g for an efficient separation and clarification continuously. The centrifugal force is generated by rotation, which separate the finely distributed solid particles from the suspension. The Decanter® is rectangular shaped having a conveyer scroll located inside a bowl, both rotating at slightly different speeds. The solids and liquids travel in the same direction (co-current) along the long zone. An adjustable impeller changes the liquid level, which affects the pressure on the solids.

In yet another embodiment, the separation device may be Flottweg Sedicanter®, a horizontal, double-conical solid bowl centrifuge for continuous separation of a liquid and a difficult-to-dewater fine solid suspension, operating at up to 5000 g. The clarified liquid phase is discharged under pressure using an automatic adjustable impeller at the cylindrical end. The externally adjustable impeller allows for the quick and precise adjustment of the pool depth inside the bowl during operation to accommodate changing process conditions and allows for effective cleaning. The dewatered solids are conveyed to the conical end of the bowl where they are discharged through ports via a combination of hydraulic pressure, internal scroll, and high G-force.

The centrifuge separates the solid phase and one or two liquids from one another. The solid phase collects at the bowl wall due to its higher density. The transport screw moves the solid continuously to the outlet openings. The liquid phase(s) flows along the transport screw, which is a specialty-designed interior scroll. Other types of separation devices manufactured by other companies may be used, that are similar in design and performance to the ones described above.

The transport screw may include a specialty-designed scroll inside the bowl. The specialty-designed scroll rotates with a differential speed (in relation to the bowl) and transports the settled solids towards the conically narrowing end of the bowl. A pitch of the scroll occurs between the scroll blades of a helical turn, performed by the scroll during one rotation. The pitch helps in transport performance of the scroll. The scroll has another design feature of a loading point to separate the media, as it enters the bowl. The scroll differs in design based on the type of material to be separated.

The specialty-designed scroll may be designed to have multiple designs, similar to the letter "S" in multiple configurations to help transport the materials inside the separation device. In another embodiment, the specialty-designed scroll may have multiple rows, multiple dividers to help move the materials, to increase throughput. Examples include a basic scroll, a slotted scroll, an xelletor scroll or other similar like scrolls from different manufacturers would be applicable.

The second wet cake 722 include cake like consistency and small amount of liquids or water. The second wet cake 722 may include protein, zein, germ, insoluble fiber, insoluble starch, non-fermentable carbohydrates, inorganic acids (i.e., acetic acid, lactic acid, butyric acid), by-products, microorganisms, and dissolved solids. The second wet cake 722 may comprise about 10% to about 40% total solids, which may include about 1% to about 5% dissolved solids and about 10% to about 40% suspended solids. The second wet cake 722 may include about 2% to about 15% fat and approximately 45% to 64% protein.

The second liquids tank 720 may include water, oil, microorganisms, protein, zein, germ, insoluble fiber, insoluble starch, non-fermentable carbohydrates, inorganic acids (i.e., acetic acid, lactic acid, butyric acid), by-products, and dissolved solids. The second liquids tank 720 may comprise about 4% to about 12% total solids, which may include about 3% to about 7% dissolved solids and about 1% to about 5% suspended solids. The second liquids tank 720 may include about 12% to about 36% fat.

Total solids refer to the components in the process stream that are not liquids. Dissolved solids (also referred to as solubles in water) refer to solid particles mixed with liquid in a process stream, which do not separate from the process stream during mechanical processing. Suspended solids (also referred to as insolubles) refer to suspended particles mixed with liquid in a process stream, which will separate from the process stream during mechanical processing. These terms are used to refer to, by weight.

The process 700 will increase the concentration of the solids content in the process stream. As a result, the amount of natural gas and electricity used for evaporating and/or drying the insoluble solids downstream is greatly reduced, and the amount of GHG and/or carbon emissions from the evaporators and dryers are reduced as well.

FIG. 8 is similar to FIG. 7, except this figure illustrates another embodiment of the FOT 122 process. Details that are not similar to FIG. 7 will be discussed below with reference to FIG. 8. The process 800 illustrates Fractionated Stillage 124 that may be used with FOT 122 in this embodiment.

In an embodiment, turning to the first liquid tank 708, the process 800 sends the liquid stream 802 from the first liquid tank 708 to the Fractionated Stillage 124 process. The liquid stream 802 includes fiber, some solids from Fractionated Stillage 124 process and syrup solids, which will be combined to produce DDG 142.

The process 800 sends the solids 804 from the Fractionated Stillage 124 process to be dried in the dryers 138A,B and sends the thin stillage or liquids 806 from the Fractionated Stillage 124, which may be a yeast enriched stream to a mixer 808. The process 800 combines this thin stillage or liquids 806, which may be yeast enriched with the second wet cake 722. The process 800 sends the combined stream from the mixer 808 to one or more dryers 138A,B to create very high protein Hi-Pro 140 with high protein product having content of approximately 45% to approximately 64% protein dry basis, Enrich Yeast Hi-Pro 144 which has the same or greater amount of protein as the Hi-Pro but also includes the enriched yeast product, of approximately 25% yeast, and DDGS 146.

FIG. 9 is similar to FIG. 7, except this figure illustrates another embodiment of the FOT 122 process. Details that are not similar to FIG. 7 will be discussed below with reference to FIG. 9. The process 900 illustrates Fractionated Stillage 124 that may be used with FOT 122 in this embodiment.

In an embodiment, turning to the first liquid tank 708, the process 900 adds a chemical 902 to the first liquid tank 708. The chemical 902 may remove the suspended solids, may reduce the surface tension of water and may reduce the viscosity. The chemical 902 may include, but is not limited to, polymers, such as synthetic water-soluble polymers, dry polymers, emulsion polymers, inverse emulsion polymers, latex polymers, and dispersion polymers. The polymers may carry a positive (i.e., cationic), a negative charge (i.e., anionic), or no charge (i.e., nonionic). Polymers with charges may include, but are not limited to, cationic flocculants, cationic coagulants, anionic coagulants, and anionic flocculants. The cationic (i.e., positive charge) and anionic (i.e., negative charge) polymers may have an ionic charge of about 10 to about 100 mole percent, more preferably about 40 to 80 mole percent. There are mineral flocculants that are colloidal substances, such as activated silica, colloidal clays, and metallic hydroxides with polymeric structure (i.e., alum, ferric hydroxide, and the like).

In embodiments, the chemical 902 may be based on a polyacrylamide and its derivatives or an acrylamide and its derivatives. An example is an active modified polyacrylamide. An example may include an acrylamide-acrylic acid resin C6H9NO3 (i.e., hydrolyzed polyacrylamide, prop-2-enamide; prop-2-enoic acid). The polymers have a specific average molecular weight (i.e., chain length) and a given molecular distribution. For instance, polyacrylamides have the highest molecular weight among synthetic chemicals, ranging from about 1 to about 20 million Daltons. There are other polymers with specific properties that may be used under specific conditions include, but are not limited to, polyethylene-imines, polyamides-amines, polyamines, polyethylene-oxide, and sulfonated compounds.

The chemical may be chitin, chitosan, chitinase, chitobiose, chitodextrin, lysozyme, and the like. Chitin is a long-chain polymer of N-acetylglucosamine, which is a derivative of glucose.

The chemical 902 used is GRAS approved, meaning it satisfies the requirements for the United States' FDA category of compounds that are "Generally Recognized as Safe." Since the chemical 902 is GRAS approved, it does not need to be removed and may be included in the distillers grains and be fed to livestock and/or other animals when used within the dosage and application guidelines established for the particular product formulation. Also, the chemical 902 may be considered a processing aid under the government agencies, such as the U.S. Food and Drug Administration, the Center for Veterinary Medicine, and the Association of American Feed Control Officials based on their standards.

The process 900 adds an effective amount of the chemical 902 to the FOT process in an inline static mixer or in a tank. Other possible ways of adding the chemical 902 include, but are not limited to fed into a clarifier, a thickener feedwell, and the like. A dosage amount of the chemical 902 may range from about 10 to about 10,000 parts per million (ppm). Another dosage may be used in concentrations of about 0.05% to about 10% of chemical 902 according to standard practices for downstream applications. The chemical 902 may be added at varying concentrations, at different stages of the process, and the like. The dosage amount of chemical 902 depends on reducing the amount of suspended solids, reducing the viscosity, and the like.

Example of Fractionated Stillage

Figure 10:
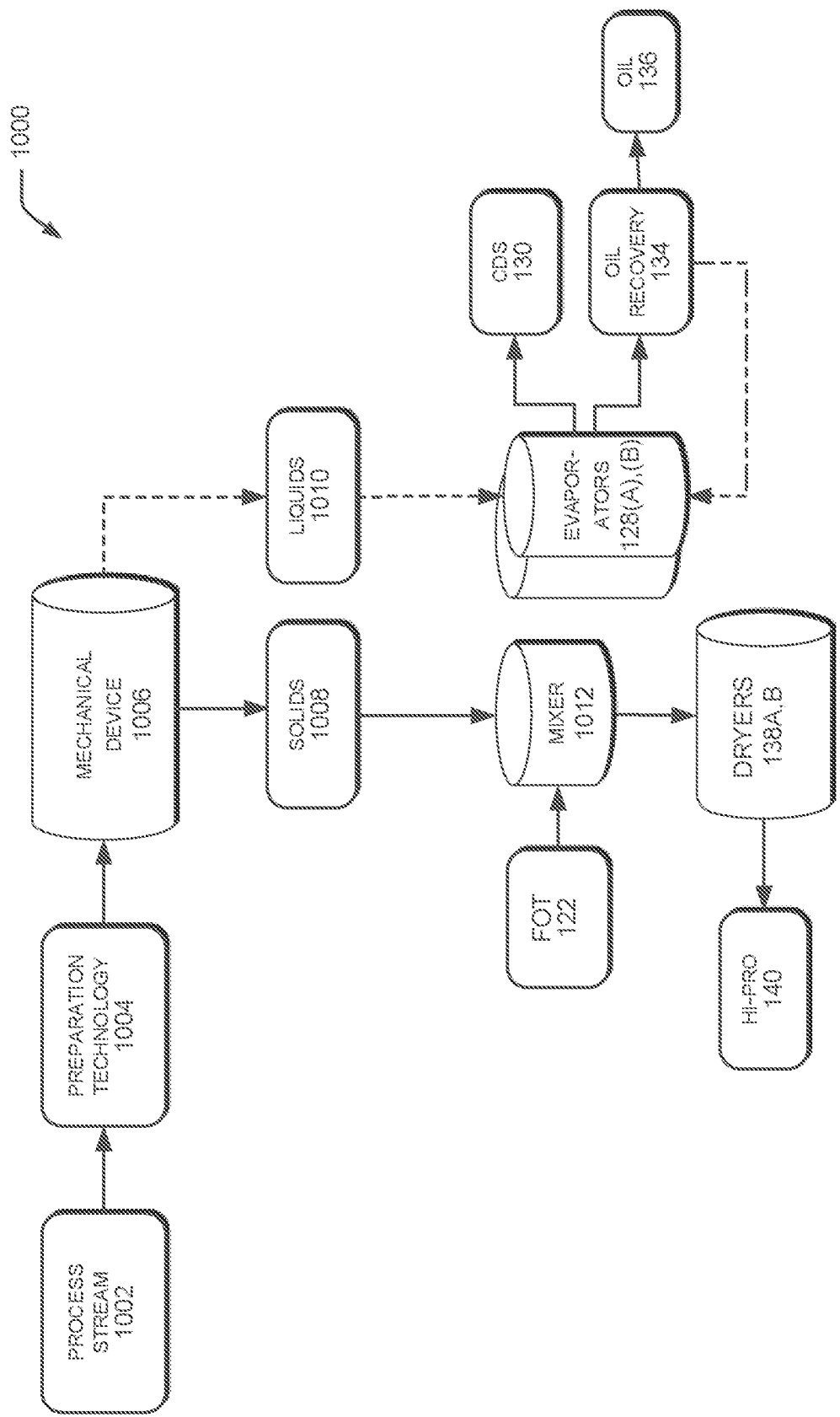
FIGS. 10 and 11 illustrate examples of the FOT process combined with other processes or equipment to further separate components to create high protein animal feed products and other products.
Figure 11:
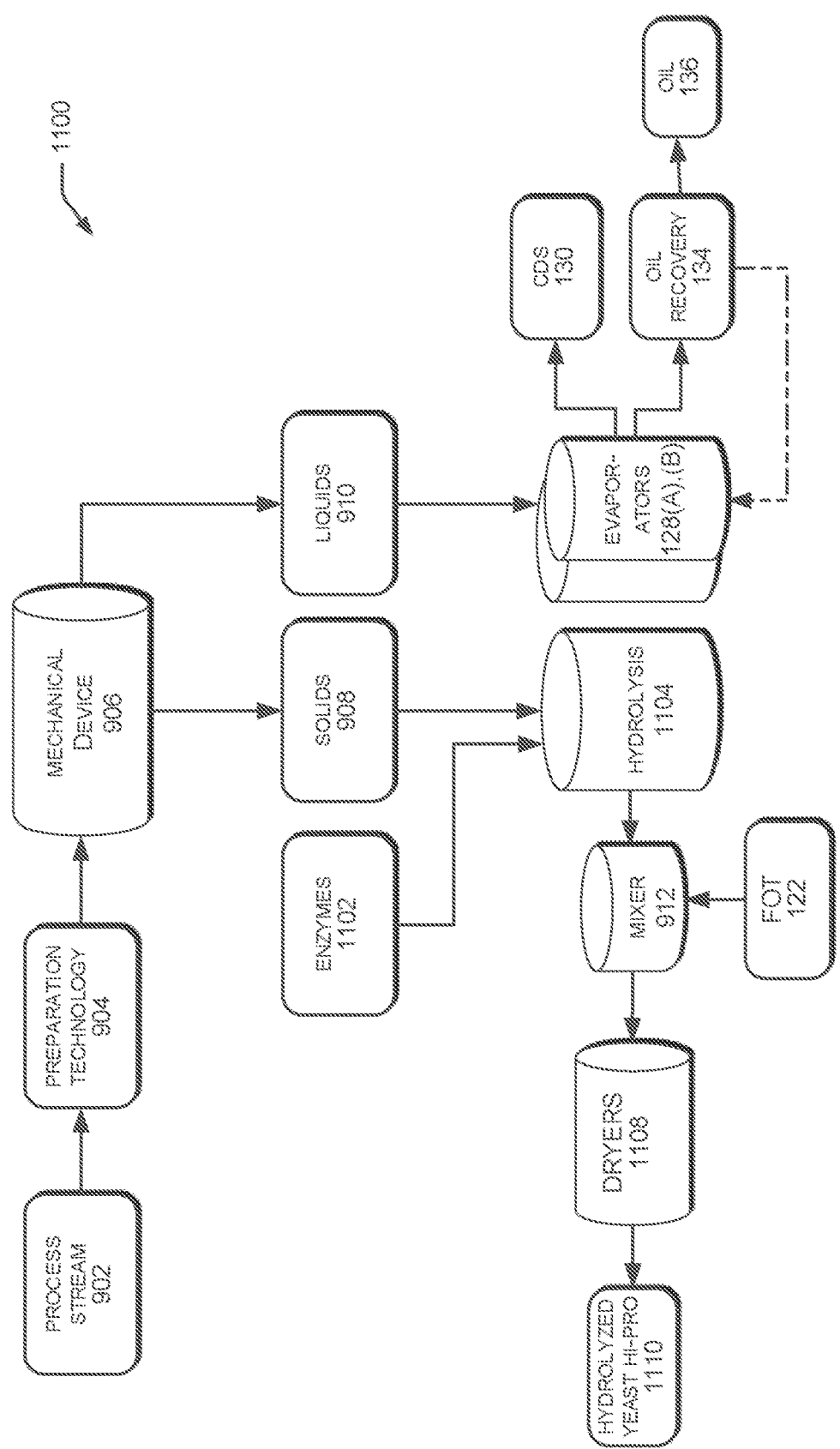

FIGS. 10 and 11 are examples of the Fractionated Stillage 124 process that may be used with FOT process in the various environments described in this specification. The Fractionated Stillage process is fully described in PCT International Pat. Application No. PCT/US2018/038352, U.S. patent application Ser. No. 16/624,811, PCT International Pat. Application No. PCT/US2018/038353, U.S. patent application Ser. No. 16/624,831, entitled "Fractionated Stillage", which are expressly incorporated by reference herein in their entireties. FIG. 10 illustrates a preferred embodiment of the Fractionated Stillage process 10000, which acts on a process stream 1002 that includes a mixture of one or more solids and one or more liquids. For example, the process stream 1002 can be a stream that includes a mixture of one or more solids and one or more liquids from a production facility, such as from the example processes 100 of FIG. 1. In an example, the process stream 1002 is the stream 122B from FOT 122. Those of skill in the art will appreciate that other possible process streams may include, but are not limited to, whole stillage, centrate, thin stillage, mid stillage, backset, post liquefaction dilution, syrup, any type of process streams or mixtures in any type of production facilities, and the like. The process stream 1002 may comprise about 4% to about 12% total solids, which may include about 3% to about 7% dissolved solids and about 1% to about 5% suspended solids (i.e., insoluble solids). The amount of fat in the process stream 1002 may range from about 12% to about 37% fat and range from around 40% to about 60% protein.

The process 1000 applies a preparation technology 1004 to be used with a mechanical device 1006 to provide a separated solids stream 1008 (also referred to simply as "solids 1008" and a separated liquids stream 1010 (also referred to simply as "liquids 1010"). The preparation technology 1004 may include non-condensable media, including, but not limited to, air or oxygen, carbon dioxide, nitrogen, other gases, and the like, which may be compressed or not. Other gases may include but are not limited to, hydrogen, helium, argon, and neon group Members in the Group 16/VIA, referred to as chalcogens, have similar properties, such as sulfur and selenium are the next two elements in the group, and they react with hydrogen gas ($H_2$) in a manner similar to oxygen. Air may be composed of 78% of nitrogen, 21% oxygen and with lesser amounts of argon, carbon dioxide, and other gases. The process 1000 adds the preparation technology 1004 to the process stream 1002 through online injection, diffusers, or aeration, which causes the liquids to have a lower density than the solids. The density differential of the liquids 1010 relative to the solids 1008 assist in the separation efficiency of the mechanical device 1006.

The mechanical device 1006 may be any type of dynamic or static mechanical processor that separates out heavier suspended solids from other lighter solids, solids from liquids, and the like. The mechanical device 1006 may include, but is not limited to, a sedicanter centrifuge, a decanter centrifuge, a disk stack centrifuge, a cyclone, a hydrocyclone, a settling tank, filtration devices, and the like. The type of mechanical device 1006 to be used depends on factors, such as type of process streams, liquid and solid goals at start and at end of process, the type of solids, density of materials, desired reduction of carbon intensity, desired reduction of GHG emissions, and the like.

The mechanical device 1006 may provide centrifugal force between 3,000 and 10,000×g for an efficient separation and clarification. The solids 1008 include cake like consistency and small amount of liquids or water. The solids 1008 may include protein, zein, germ, insoluble fiber, insoluble starch, non-fermentable carbohydrates, inorganic acids (i.e., acetic acid, lactic acid, butyric acid), by-products, microorganisms, and dissolved solids. The solids 1008 may comprise about 10% to about 40% total solids, which may include about 1% to about 5% dissolved solids and about 10% to about 40% suspended solids. The solids 1008 may include about 2% to about 15% fat and about 20% to about 64% protein.

The liquids 1010 include water, oil, microorganisms, protein, zein, germ, insoluble fiber, insoluble starch, non-fermentable carbohydrates, inorganic acids (i.e., acetic acid, lactic acid, butyric acid), by-products, and dissolved solids. The liquids 1010 may comprise about 4% to about 12% total solids, which may include about 3% to about 7% dissolved solids and about 1% to about 5% suspended solids. The liquids 1010 may include about 12% to about 36% fat.

Total solids refer to the components in the process stream that are not liquids. Dissolved solids (also referred to as solubles in water) refer to solid particles mixed with liquid in a process stream, which do not separate from the process stream during mechanical processing. Suspended solids (also referred to as insolubles) refer to suspended particles mixed with liquid in a process stream, which will separate from the process stream during mechanical processing. These terms are used to refer to, by weight.

The process 1000 sends the solids 1008 to a mixer 1012 to be mixed with the components from FOT 122 process. The process 1000 sends this stream to the dryers 138A,B to create another version of very high protein Hi-Pro 140.

FIG. 11 is similar to FIG. 10, except this figure illustrates another embodiment of the Fractionated Stillage process. Details that are not similar to FIG. 10 will be discussed below with reference to FIG. 11. The process 1100 adds enzymes 1102 which are combined with the solids 908 to hydrolysis 1104 or enzymatic hydrolysis. Hydrolysis 1104 is a chemical breakdown of a compound due to reaction with water. The process 1100 sends the hydrolysate from hydrolysis 1104 to a mixer 912, which combines the product from FOT 122 process with the high protein. The process 1100 sends this combined product to a dryer 1108 to create a feed product, Hydrolyzed Yeast Hi-Pro 1110.

The addition of the enzymes may help digest carbohydrates, break down fat, or help reduce the viscosity by concentrating the process stream to a higher total solids. The enzymes may include, but are not limited to, alpha-amylase, beta-glucanase, beta-glucosidase, endoglucanase, gluconase, lipase, magnesium peroxidase, peroxidase, cellulase, hemicellulase, ligninase, oxido-reductase, phytase, protease, peroxidase, xylanase, a mixture, and the like. The enzymes may be added in an amount ranging from 0.01% to 0.5% weight of enzymes to dry weight of total solids, depending on the concentration of the enzymes or its substrate, activity of an enzyme, of active cells, and the like. Factors affecting the enzyme reactions include, but are not limited to, temperature, pH, enzyme concentration, substrate concentration, presence of inhibitors or activators, and the like.

The protease enzyme is known as an enzyme that performs proteolysis, a protein catabolism by hydrolysis of peptide bonds. The protein hydrolysis is the breakdown of protein into smaller peptides and free amino acids. The amount of protease enzyme added may range from 0.003% to 0.15% w/w % (depending on specific activity of enzyme formulations) of incoming grain and added at temperature ranges from about 20° C. to about 80° C. The pH of the hydrolysis may be adjusted from about 4.0 to about 6.5.

Addition of Enzymes

Figure 12:
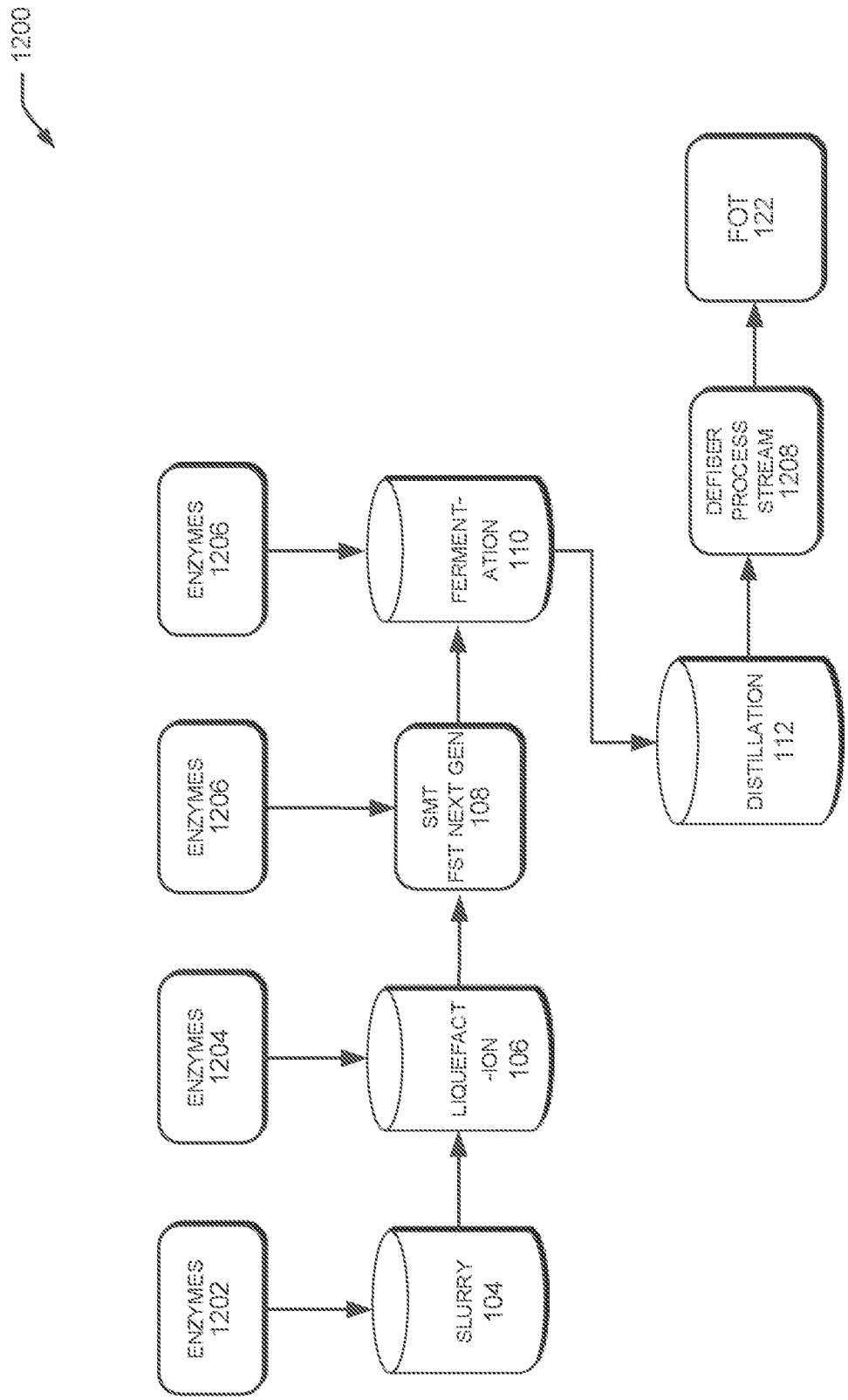
FIGS. 12 and 13 illustrate examples of adding enzymes to the different process streams prior to entering the FOT process to create high protein animal feed products and other products.
Figure 13:
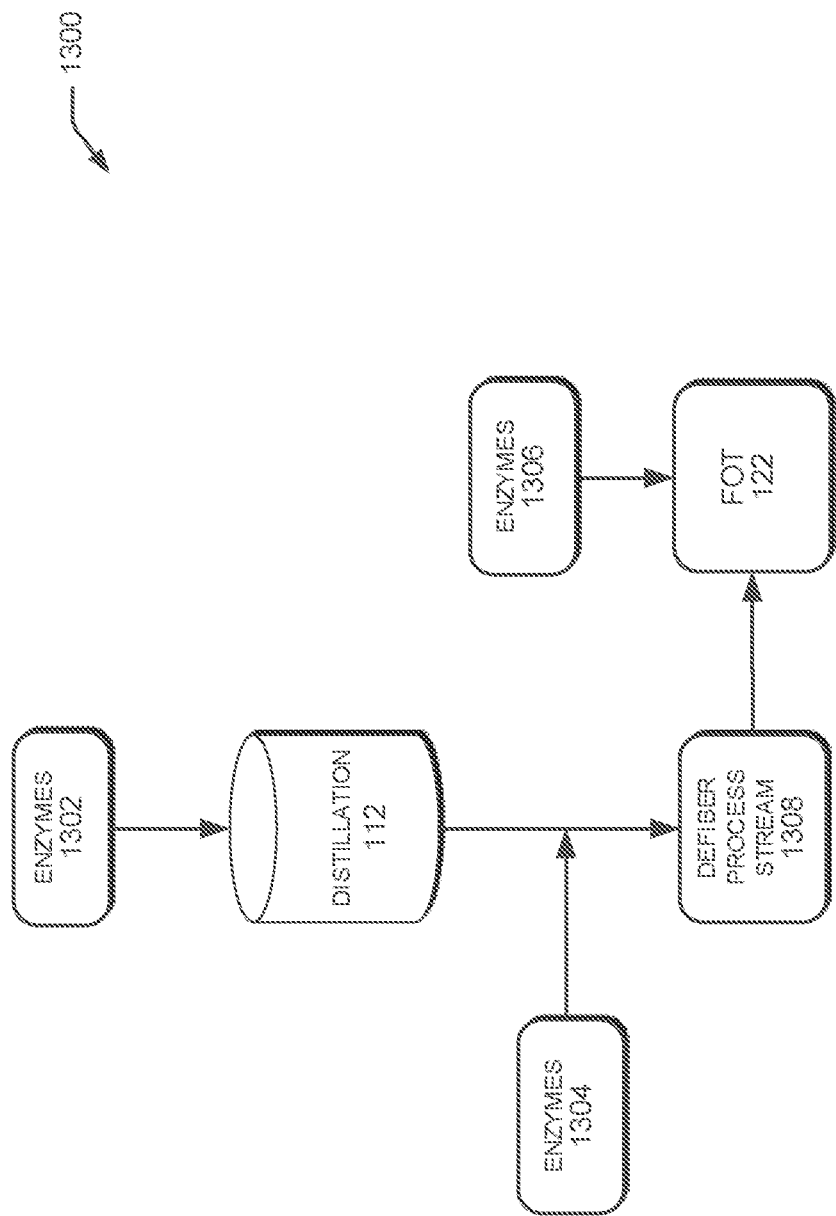

FIGS. 12 and 13 illustrate examples of adding enzymes or processing aids to the process that may be used with the various environments described in this Specification with the FOT process. While enzymes are shown in FIGS. 12 and 13, processing aids may be used that were described with reference to FIG. 7. FIG. 12 illustrates enzymes that may be added in a single step or in multiple steps in the front end of the process 1200. The addition of the enzymes may help reduce the viscosity by concentrating the process stream to a higher total solids.

As shown, the process 1200 may add enzymes in any of these situation, adds enzymes 1202 to slurry 104, adds enzymes 1204 to liquefaction 106, adds enzymes 1206 to SMT V2 FST NEXT GEN 108, add enzymes 1208 to fermentation 110, or a combination. The process 1200 with enzymes added, will continue from fermentation 110 to distillation 112 to defiber process stream 1210 and to the FOT 122 process.

FIG. 13 illustrates adding enzymes in the back-end process 1300. In this instance, the process 1300 adds enzymes that may be in a single step, two steps, or in multiple steps at multiple locations. The process 1300 may add enzymes 1302 to distillation 112, may add enzymes 1304 to post distillation, may add enzymes 1306 in the defiber process stream 1308, or use any combination of adding enzymes. The enzymes in the FOT 122 process may be added in the mix tank 712. As described, the enzymes may be added in single or multiple steps in FOT 122 process and in various locations.

The enzymes may include, but are not limited to, acid proteases, acid phosphatases, alpha-amylase, arabinose, beta-glucanase, beta-glucosidase, gluconase, endoglucanase, cellulase, esterase, gluco-amylase, hemicellulase, laccase, lipase, oxidoreductase, magnesium peroxidase, peroxidase phytase, protease, pectinases, protease, phosphorlipases, phosphatase, xylanase, a mixture, and the like. The dosage of the enzymes may be from 0.001-15 mg-EP/g-TS, optimally 0.002-5 mg-EP/g-TS, and more optimally 0.003-1 mg-EP/g-TS. The temperature of the enzymes may range from approximately 25° C. to approximately 105° C., optimally 45-95° C., and more optimally 50-90° C. The amount of time for contact with the process stream may vary from approximately 0.33 of one hour to 12 hours, optimally 1 to 8 hrs, and more optimally 2 to 6 hrs. The pH for the process stream may range from 4.0 to 7.0, optimally 4.2 to 5.5, and more optimally 4.3 to 5.2. There are different optimal ranges for temperature and pH, which can limit certain of these enzymes to lower temperature areas of the process, such as fermentation.

The pH through the entire process would be suitable for most of these enzyme with activities in the pH of 5 range, such as acid protease, acid phosphatase, all cellulase and xylanase, etc. The main consideration is temperature due to two discreet temperature windows at 185° F. and 90° F., excluding the FOT process feed tank. In that tank, there may be some additional flexibility to augment temperature as this will be a new tank to the process with the FOT process.

It is important to not convert the oligomers all the way to fermentable sugars (which will also be process area dependent based on applications), such as arabinose and xylose as this will increase the contamination potential in the process through the water washing system in FOT 122 process, which will further limit the applicable enzymes and could be key to claims of enzyme type and mode of action.

In an embodiment, the enzymes may be added in an amount ranging from 0.01% to 0.5% weight of enzymes to dry weight of total solids, depending on the concentration of the enzymes or its substrate, activity of an enzyme, of active cells, and the like. Factors affecting the enzyme reactions include, but are not limited to, temperature, pH, enzyme concentration, substrate concentration, presence of inhibitors or activators, and the like.

The biological, nonpolar/polar aprotic/polar protic solvents, and or thermochemical aids may be used to increase protein content by solubilizing undesirable or targeted fractions found within the substrate composition may be employed. Instead of enzymes, the additions may be aids, which may include the following: alcohol, alkane, alkene, carboxylic acids (organic acids), diol, glycol, furan, ferrulic acid, ketone, mineral acid (inorganic acids), and strong and weak bases.

The thermochemical treatments and solvent extractions methods would be specific to the wet cake at 50% protein, where by the cake would be isolated and treated by chemical means or dilute solvents. These treatments and solvent extractions could occur in the FOT 122 process, such as in a feed tank.

The beta-glucanase enzyme breaks down beta-linked glucose polymers that are associated with grains. The β-1, 3 glucanase breaks down β-1, 3-glucans (1→3), a polysaccharide made of glucose sub-units. The β-glucan break down may occur randomly of the molecule. The β-1, 6 glucanase enzyme breaks down β-1, 6-glucans. Furthermore, there are beta-glucanase enzymes that break down β-1, 4-glucans. The amount of beta-glucanase added may range from 0.003% to 0.15 w/w % (depending on specific activity of enzyme formulations) of incoming grain and added at temperature ranges from about 20° C. to about 95° C. The beta-glucanase does not need a low temperature, so the risk of bacterial contamination is avoided.

Beta-glucanase has been found to be particularly effective with some larger chains, as it attacks (1→3), (1→4)-β-glucan fiber to liberate smaller fragments (i.e., a cell wall modification). The rate of modification is determined by contents of the cell walls of beta-glucan. Beta-glucanase hydrolyzes beta D-glucan component and breaks down the beta-linked glucose polymers that are often associated with cereal grains. Beta-glucanase has a high degree of stability that makes it durable to pH extremes.

The protease enzyme is known as an enzyme that performs proteolysis, a protein catabolism by hydrolysis of peptide bonds. The protein hydrolysis is the breakdown of protein into smaller peptides and free amino acids. The amount of protease enzyme added may range from 0.003% to 0.15% w/w % (depending on specific activity of enzyme formulations) of incoming grain and added at temperature ranges from about 20° C. to about 80° C. The pH of the hydrolysis may be adjusted from about 4.0 to about 6.5. The enzyme may be retained for about 16 to about 32 hours in a process stream.

In an embodiment for slurry 104, liquefaction 106 or SMT V2 FST NEXT GEN 108, the temperature may range from approximately 1600 to approximately 1950 with a retention time may range from approximately one hour to approximately three hours. Enzymes may include the list as described above, and are not limited to: amylase, laccase (lignin solubilization), beta-glucanase, pectinase, protease, mixture, and the like.

In an embodiment for adding enzymes to fermentation 110, the temperature may range from approximately 700 to approximately 1100 with a long retention time that may range from approximately 36 hours to approximately 50 hours.

In an embodiment for adding enzymes to whole stillage or defiber process stream 1202, 1308, the temperature may range from approximately 160° to approximately 200° where a retention time may range from approximately one hour to approximately three hours.

In an embodiment for adding enzymes to the FOT 122 process, the temperature may range from approximately 100° to approximately 205° where a retention time may range from approximately one hour to approximately three hours.

Examples of Results

The FOT 122 process was executed in trials at a plant, starting with a defiber process stream and creating high protein animal feed product. The tables below show example data from the laboratory.

Tables I. and II. illustrate example data collected from the FOT 122 process at the plant trials. The protein content average is 48.25% and 49.3% dry basis, which is very good for initial trials. The protein content has increased up to 64% dry basis in recent trials.

TABLE I

| | FOT Lab Data | | | | |
|---|---|---|---|---|---|
| | Level Found | | | Reporting | |
| Analysis | As Received | Dry Weight | Units | Limit | Method |
| Sample ID: W0187-000-0018 Lab Number: 13208064 | | | | | |
| Moisture | 2.27 | | % | 0.01 | AOAC 930.15 |
| Dry matter | 97.73 | | % | 0.010 | Calculation |
| Protein (crude) | 48.2 | 49.3 | % | 0.20 | AOAC 990.03 |
| Fat (crude) | 2.54 | 2.60 | % | 0.10 | AOAC 2003.05 |

TABLE I-continued

FOT Lab Data

| | Level Found | | Reporting | | |
| --- | --- | --- | --- | --- | --- |
| Analysis | As Received | Dry Weight | Units | Limit | Method |
| Sample ID: W0187-000-0018 Lab Number: 13208064 | | | | | |
| Fiber (acid detergent) | 21.7 | 22.2 | % | 0.5 | ANKOM Tech. Method |
| Ash | 1.12 | 1.15 | % | 0.10 | AOAC 942.05 |
| Total digestible nutrients | 74.6 | 76.3 | % | 0.1 | Calculation |
| Net energy (lactation) | 0.77 | 0.79 | Mcal/lbs | 0.01 | Calculation |
| Net energy (maint.) | 0.80 | 0.82 | Mcal/lbs | 0.01 | Calculation |
| Net energy (gain) | 0.54 | 0.55 | Mcal/lbs | 0.01 | Calculation |
| Digestible energy | 1.50 | 1.53 | Mcal/lbs | 0.01 | Calculation |
| Metabolizable energy | 1.28 | 1.31 | Mcal/lbs | 0.01 | Calculation |
| Aspartic Acid | 3.41 | 3.49 | % | 0.01 | AOAC 994.12 (Alt. III) |
| Threonine | 1.84 | 1.88 | % | 0.01 | AOAC 994.12 (Alt. III) |
| Serine | 2.49 | 2.55 | % | 0.01 | AOAC 994.12 (Alt. III) |
| Glutamic Acid | 8.43 | 8.62 | % | 0.01 | AOAC 994.12 (Alt. III) |
| Proline | 4.08 | 4.17 | % | 0.01 | AOAC 994.12 (Alt. III) |
| Glycine | 1.92 | 1.96 | % | 0.01 | AOAC 994.12 (Alt. III) |
| Alanine | 3.42 | 3.50 | % | 0.01 | AOAC 994.12 (Alt. III) |

The fat content is low, which is good for dairy cattle. The ash content is low.

TABLE II

FOT Lab Data

| | Level Found | | Reporting | | |
| --- | --- | --- | --- | --- | --- |
| Analysis | As Received | Dry Weight | Units | Limit | Method |
| Sample ID: W0187-000-0018 Lab Number: 13208064 (con't) | | | | | |
| Cystine | 0.86 | 0.88 | % | 0.01 | AOAC 994.12 (Alt. I) |
| Valine | 2.51 | 2.57 | % | 0.01 | AOAC 994.12 (Alt. III) |
| Methionine | 1.02 | 1.04 | % | 0.01 | AOAC 994.12 (Alt. I) |
| Isoleucine | 1.93 | 1.97 | % | 0.01 | AOAC 994.12 (Alt. III) |
| Leucine | 5.81 | 5.94 | % | 0.01 | AOAC 994.12 (Alt. III) |
| Tyrosine | 2.21 | 2.26 | % | 0.01 | AOAC 994.12 (Alt. III) |
| Phenyl-alanine | 2.63 | 2.69 | % | 0.01 | AOAC 994.12 (Alt. III) |
| Lysine (total) | 1.74 | 1.78 | % | 0.01 | AOAC 994.12 (Alt. III) |
| Histidine | 1.42 | 1.45 | % | 0.01 | AOAC 994.12 (Alt. III) |
| Arginine | 2.16 | 2.21 | % | 0.01 | AOAC 994.12 (Alt. III) |
| Tryptophan | 0.52 | 0.53 | % | 0.01 | AOAC 988.15 (mod) |

Based on the essential amino acids, the values for methionine ranged from 1% to 2%, lysine also ranged from 1% to 2%, histidine range from 1% to 2%, and tryptophan averaged 0.52%, which are desirable for animal feed product.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method for creating feed products, the method comprising:
    separating, via a fiber separation technology system, a process stream into a fiber process stream and a defiber process stream;
    separating a first set of solids of the defiber process stream from liquids of the defiber process stream to form a first wet cake and a first defiber liquids stream;
    forming, from the first set of solids, a protein enriched process stream, the protein enriched process stream enriched in protein relative to the defiber process stream;
    separating a second set of solids of the first defiber liquids stream from liquids of the first defiber liquids stream to form a defiber solids stream and a second defiber liquids stream;
    adding non-condensable media to the first defiber liquids stream prior to the separating the second set of solids of the first defiber liquids stream from the liquids of the first defiber liquids stream;
    mixing the defiber solids stream with the protein enriched process stream to form a combined process stream; and
    drying the combined process stream to create an animal feed product.

2. The method of claim 1, further comprising fermenting and distilling the process stream prior to the separating the process stream.

3. The method of claim 1, further comprising sending the second defiber liquids stream through one or more evaporators.

4. The method of claim 3, further comprising creating, via the one or more evaporators, condensed distillers solubles (CDS).

5. The method of claim 4, further comprising recovering, via the one or more evaporators, oil from the second defiber liquids stream.

6. The method of claim 4, further comprising combining the fiber process stream with the condensed distillers solubles (CDS) to form a fiber and syrup product.

7. The method of claim 1, wherein the first set of solids are a portion of a first, dilutable stream, and wherein the forming the protein enriched process stream further comprises:
diluting the first dilutable stream containing the first set of solids with water to form a diluted stream; and
sending the diluted stream through a separation device to form the protein enriched process stream.

8. The method of claim 7, wherein the protein enriched process stream is enriched in protein relative to the first dilutable stream.

9. The method of claim 7, wherein the sending the diluted stream through the separation device forms the protein enriched process stream and a separated liquids stream.

10. The method of claim 9, further comprising mixing a separated liquids stream with a whole stillage stream to form the process stream.

11. The method of claim 1, wherein the process stream comprises whole stillage, and further comprising sending the process stream comprising whole stillage to the fiber separation technology system.

12. The method of claim 1, wherein the fiber separation technology system comprises at least one of a paddle screen, a multi-zoned screening apparatus (MZSA), a pressure screen, a rotary press, and a wedge wire screen.

13. The method of claim 1, wherein the process stream is formed from a feedstock including a grain, the grain including an oil and a protein.

14. The method of claim 13, further comprising grinding, by a grinding step, the process stream prior to the separating the process stream.

15. The method of claim 14, wherein the grinding step comprises grinding the process stream into at least one of a meal, a powder, or a flour.

16. The method of claim 14, wherein after the grinding step, the method further comprises fermenting, via a fermenting step, the process stream and distilling, via a distillation step, the process stream prior to the separating the process stream.

17. The method of claim 16, wherein a whole stillage is created in response to the fermenting step and the distillation step.

18. The method of claim 16, wherein during the distillation step, enabling a vapor alcohol to exit through a top portion of a distillation column and a liquid alcohol to exit the distillation column through a vapor alcohol condensing step.

19. The method of claim 1, wherein the defiber process stream comprises between 4% and 19% total solids.

* * * * *